(12) United States Patent
Bryan et al.

(10) Patent No.: US 8,260,865 B2
(45) Date of Patent: *Sep. 4, 2012

(54) SYSTEM AND METHOD FOR PROCESSING INSTANT MESSAGES

(75) Inventors: Daniel Bryan, Cambridge, MA (US);
Nikita Ivanov, Cambridge, MA (US);
Daniel Judson, Cambridge, MA (US);
Yusang Kwan, Newton, MA (US);
David Levine, Winchester, MA (US);
Andrew Nanopoulos, Wakefield, MA (US); Furqan Nazeeri, Arlington, MA (US); Brandon Schory, Brighton, MA (US); Nader Shwayhat, New York, NY (US)

(73) Assignee: Pivot Solutions, Inc., Boston, MA (US)

( * ) Notice: Subject to any disclaimer, the term of this patent is extended or adjusted under 35 U.S.C. 154(b) by 605 days.

This patent is subject to a terminal disclaimer.

(21) Appl. No.: 12/241,884

(22) Filed: Sep. 30, 2008

(65) Prior Publication Data
US 2010/0082755 A1    Apr. 1, 2010

(51) Int. Cl.
*G06F 15/16* (2006.01)
*G06F 17/00* (2006.01)
(52) U.S. Cl. ........................ 709/206; 715/234
(58) Field of Classification Search .......... 709/204–207; 705/37; 715/234–237
See application file for complete search history.

(56) References Cited

U.S. PATENT DOCUMENTS

| | | | |
|---|---|---|---|
| 2004/0078596 A1* | 4/2004 | Kent et al. ................... | 713/201 |
| 2005/0021445 A1* | 1/2005 | Caro ............................ | 705/37 |
| 2006/0026091 A1* | 2/2006 | Keen et al. ................... | 705/37 |
| 2006/0041684 A1* | 2/2006 | Daniell et al. ................ | 709/246 |
| 2006/0095511 A1* | 5/2006 | Munarriz et al. ............. | 709/203 |
| 2006/0101329 A1* | 5/2006 | Han et al. ..................... | 715/513 |
| 2007/0043646 A1* | 2/2007 | Morris ......................... | 705/37 |
| 2008/0250107 A1* | 10/2008 | Holzer et al. ................ | 709/206 |
| 2009/0254616 A1* | 10/2009 | Cheung et al. ............... | 709/204 |

* cited by examiner

*Primary Examiner* — Chirag R Patel
(74) *Attorney, Agent, or Firm* — Lando & Anastasi, LLP

(57) ABSTRACT

Various aspects relate to using structured messages within systems that implement instant messaging function in a distributed computing environment. In particular, structured information may be encoded and embedded in unstructured instant messages and communicated among one or more computer systems, networks, applications or other entities. In one aspect, instant messaging may be leveraged as middleware for application integration. Other aspects relate to using structured message information to perform functions in a distributed instant messaging system. For example, structured message information may be used to control the display of instant message information to a user, or may be used to control how the instant message information is distributed, processed, or otherwise handled by a receiving system, application or process. Other aspects relate to an interface for displaying information relating to a number of instant messaging conversations to a user. Further, aspects relate to using instant messaging in a trading environment.

19 Claims, 15 Drawing Sheets

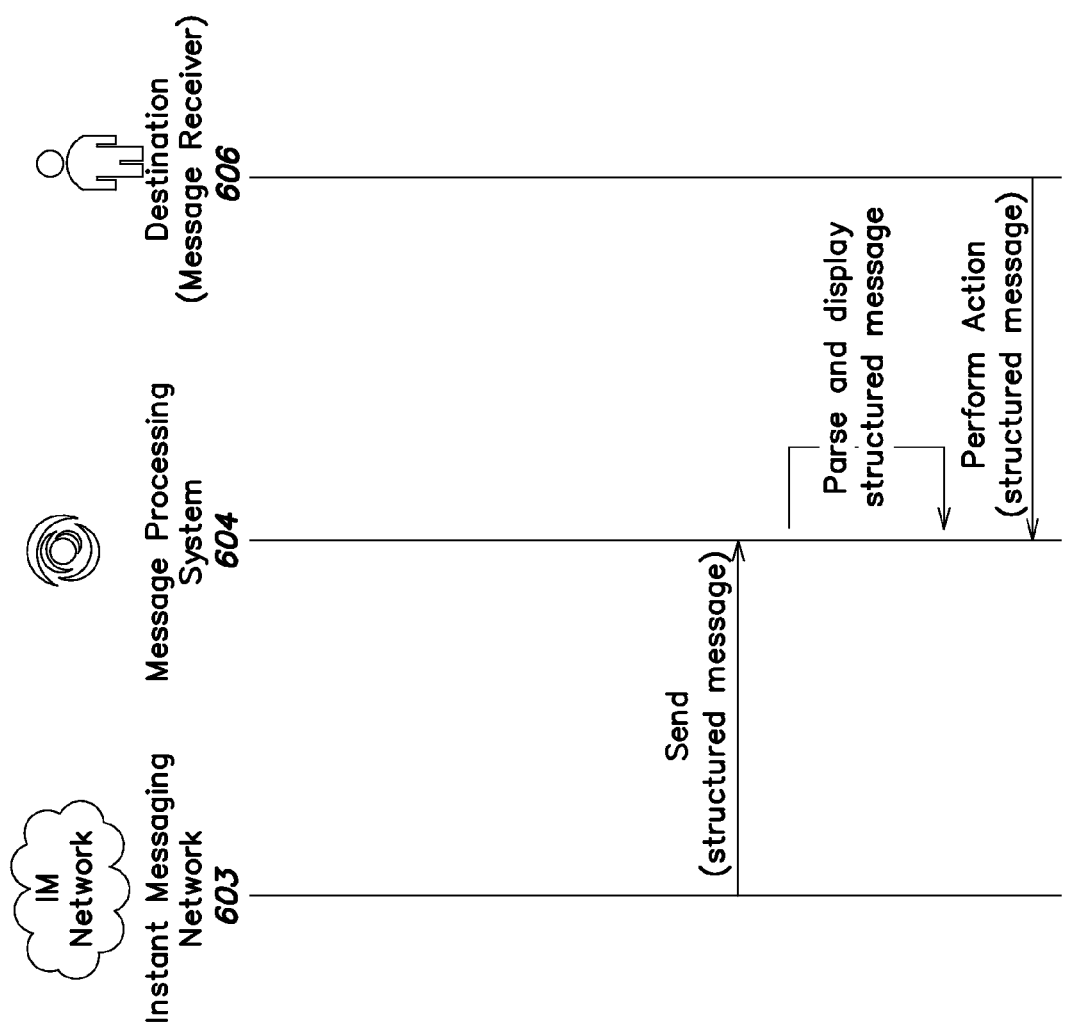

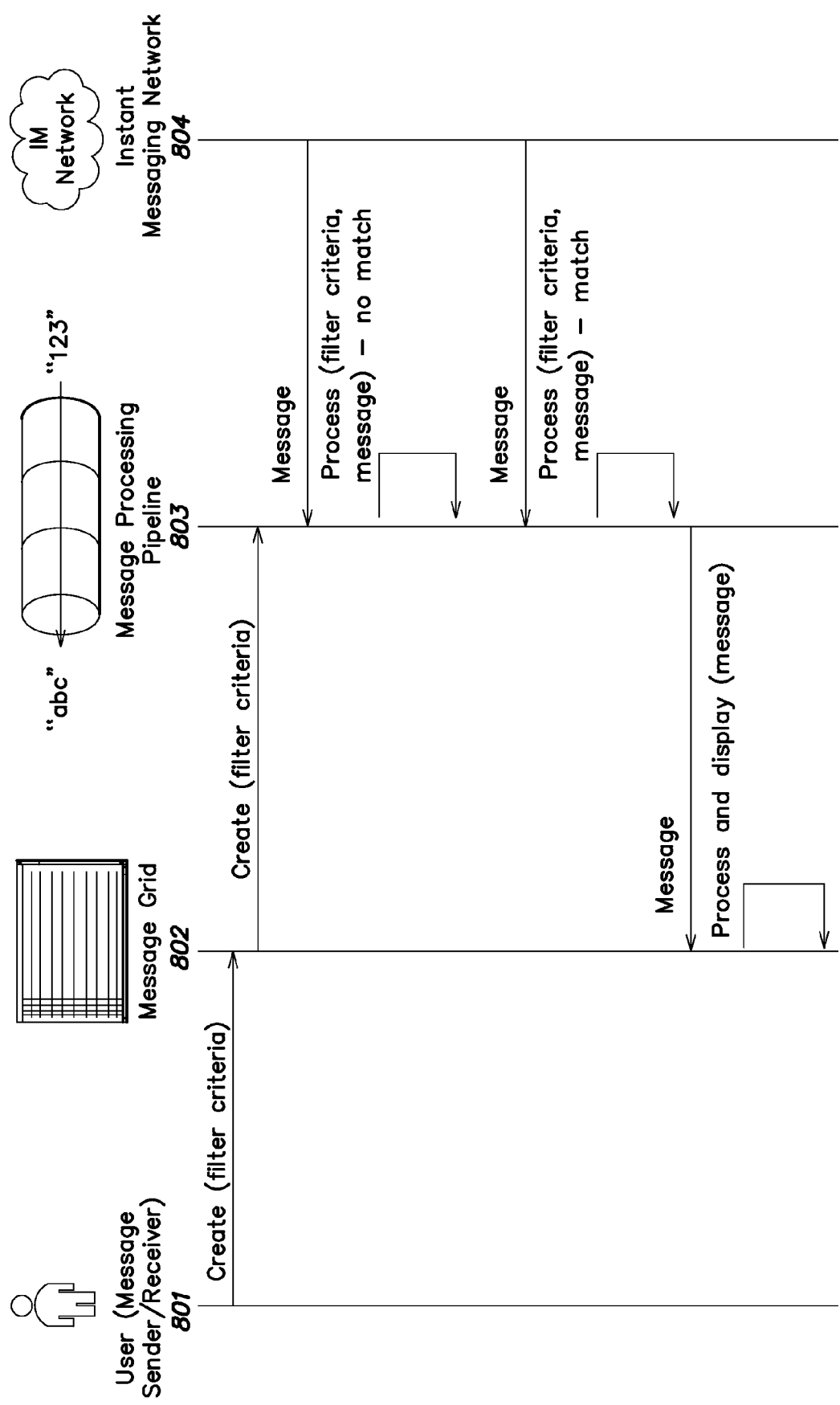

SYSTEM AND METHOD FOR PROCESSING INSTANT MESSAGES

BACKGROUND OF THE INVENTION

1. Field of Invention

The field of the invention relates generally to communication networks, and more particularly, to the use of instant messaging for communicating between entities.

2. Discussion of Related Art

In trading of equities, equity options, fixed income, energy, foreign currency derivatives, etc. collectively referred to herein as "securities," have been traded in this country since the late 1700s. Traditionally, such securities have been traded on floor-based exchanges, such as the New York Stock Exchange (NYSE) or the American Stock Exchange (AMEX). The predominant method of trading in these floor-based environments is known as the "open outcry" system, which involves oral communications between market professionals at a central location in open view of other market professionals. In this system, an order is typically relayed out to a trader standing in a "pit." The trader shouts out that he has received an order and waits until a broker shouts back contract terms, and a trading transaction then results. In an effort to preserve this antiquated system of floor-based trading, the implementation of computer-based technology in the exchanges has been slow. However, some trading processes have been automated or partially automated.

Instant messaging (sometimes referred to as IM or "IMing") is commonly used to communicate between computer users in an instantaneous manner. There are many different applications that support instant messaging such as, for example, the well—known AOL Instant Messenger (AIM), Microsoft's Network Messenger services (MSN), and Yahoo!'s Yahoo! Messenger application program, Google's Google Talk application program, among others. Such application programs run on the number of different platforms including personal computers (PCs), mobile phones, PDAs or other environments. IM differs from ordinary e-mail in that there is immediacy in the message exchange, and also instant messaging makes a continued exchange of messages simpler than sending e-mail back and forth. Most communications are text-only.

To access an IM service, a user registers with a service provider and, after connecting to the Internet (or other appropriate data network), enters the user's screen name and password to login to an IM network. Popular IM applications include AOL's Instant Messenger (AIM), Microsoft's Network Messenger Services (MSN), and Yahoo!'s Yahoo! Messenger. Once a user has logged in to an appropriate IM network, his/her presence on the system is made known to all authorized partners (commonly termed "buddies"). The user can then engage in free-form, textual conversations with other IM users connected to the system.

A recent development in trading includes the use of Instant Messaging functionality to communicate instructions to a trader that in turn performs securities trading functions on behalf of clients. It is beneficial to use such in instant messaging functions for communicating time-sensitive information. However, according to one aspect of the invention, it is realized that it is difficult to manage large amounts of instant message information using conventional instant messaging applications and their associated interfaces.

SUMMARY OF THE INVENTION

It is appreciated that instant messaging is typically used by individuals as a method of collaborating with one another by sending simple text messages. Apart from formatting markup (e.g., font, color), instant messaging applications send/receive unstructured free text strings. According to one aspect, it is appreciated that structured messaging may be used to permit sending applications or other entities to embed semantic information in a text message that can be interpreted by the receiving application that could be used to guide application functionality. Stated differently, structured messaging may permit instant messaging technology to be leveraged as middleware for application integration.

Generally, structured messages may be used for performing different classes of functions within a distributed computing environment. Structured instant messages may be used for application integration, presentation functions, control functions, and translation functions.

There are many different uses for structured instant messages within the distributed computing environment. In one application, a system (e.g., a client computer system) may be capable of creating an instant message and generating structured information within the instant message. The instant message containing the structured information may be sent to other destinations (e.g., a client, server, software application, computer system, etc.). The structured information may be interpreted by a receiving system and various actions may be taken in response to the structured content. For instance, structured content may determine how the instant message is displayed, routed or processed, may cause an action to be performed by the receiving system or any intermediate system receiving the instant message. In one embodiment, the receiving system may be adapted to use the structured information within the instant message.

According to another embodiment, a processor may be provided that is capable of receiving unstructured instant message content and adding structure to the instant message, which can be transmitted to other systems. In such a case, the processor may receive an unstructured instant message (e.g., from a client system, network or other entity), modifies the instant message to include structure information, and send the modified instant message to one or more destinations. This may be useful, for example, when a client running a conventional instant message application does not have the native ability to add structure to instant messages, and it is desired that the instant message sent by a client have structure. Also, instant messages that originate from networks that do not have the capability of generating structure could have structure added to these messages by a suitable processor.

As discussed above, one or more destinations may be capable of using structured information. In one embodiment, a grid is provided that displays information relating a number of different instant message conversations. For instance, such a grid may be provided as part of an application program provided to a user, permitting the user to view information relating to multiple conversations displayed in the grid.

It is appreciated that in conventional instant message application interfaces (e.g., the AOL Instant Messenger application), messages are displayed serially in the instant message interface as they are received at a client workstation. However, it is appreciated that some environments that use instant messaging, hundreds if not thousands of instant messages may be received at a client, and a user may be required to respond to only a subset of the received messages. In a conventional instant messaging application interface, it is impractical to view and respond to a large amount of messages. Because, according to one embodiment, a number of different conversations may be displayed in a more convenient manner, the user is more capable of processing large numbers of instant messages using the interface.

According to one embodiment, the structure may indicate where within an instant message particular information resides. For instance, in the case of a ticker symbol "IBM" appearing in an unstructured portion of a message, the structured information may indicate where within the unstructured text the ticker symbol appears. To this end, an instant message processor may be provided that processes unstructured portions of a message and identifies relevant content.

According to another aspect, it is appreciated that may be helpful to send structured information in an instant message that is capable of being interpreted by a destination and performing some function or action. Control or command information may be encoded within the instant message. This control information may be used, for example, to perform control functions associated with a receiving system, adjust display parameters for information that is displayed to a user at a client workstation, forward the instant message to particular destinations, or to perform other functions or action relating to instant messages. Such control information may be used, for example, by applications, systems, or other entities that are configured to process instant messages.

Examples of such applications that use structured messages include an order management server that uses information within instant messages to perform financial transactions, an instant message interface such as a message grid that can present instant message information to a user in a structured way, a software process that forwards instant messages to one or more users (e.g., a software process that directs instant messages to different traders, computers or applications), or any other application configured to use instant message information.

According to one embodiment, the control information is embedded within an area of the instant message that is unused by the particular instant message application. For instance, the Yahoo! Messenger application program may not recognize information in a particular area of the instant message, and therefore the application program does not provide an error or otherwise respond to the information within this area of the instant message. Thus, an intervening system can modify a received instant message by embedding control information within this unrecognized area, yet not disturb the processing or display of the instant message by the standard Yahoo! Messenger application program. In this way, the instant messaging network may be used as a vehicle for supporting higher-end applications using instant messaging as a transport layer, yet not "break" existing instant message services as a result.

Yet another aspect of the present invention relates to a system that is capable of creating using structured instant messages in a trading environment. It is appreciated that many different systems may be capable of interpreting and displaying instant messages, particularly when being used in a trading environment. For instance, in a system that uses instant messaging to perform purchases (e.g., in an order management system), instant messages may be used to place, confirm, and place orders for securities. It is appreciated that although instant messaging is used by users to convey business critical data, it is generally unusable by other applications because the content has no structure and therefore is not semantically parsable. By adding structure to the instant message, applications such as pricing systems, risk management systems, order management systems, etc. can receive and process business critical data contained within the instant message because the modified instant message contains structure that can be easily parsed.

For instance, in a system that uses instant messaging, examples of structured content that could be could be inserted into an instant message that controls how the instant message is handled may include:

Market classification—equities, equity options, energy derivatives, natural gas options, or any other security or derivative market Message category—morning report, noon update, alert, or any class that allows the information to be grouped categorically by the receiver of the instant message as intended by the sender Message type classification—indication of interest, show, market look, trade advertisement, quote, or other classification information Attributes of a transaction—size, side, quantity, limit price, original sender, target recipient(s), actions to be performed In the case of an order management system that performs purchasing functions, structured content may be used to initiate actions within an order management system.

Other types of systems may also benefit from information generated within instant messaging networks. For example, a pricing/risk system that determines, based on historical trading information, the expected volatility and price for a particular stock. However, it may be useful to have current information regarding a particular stock to more accurately determine pricing. Also, in the case of a derivatives market, where there is not enough historical information on the derivative to determine risk or price, it may be helpful to have current information to more accurately set pricing. In one embodiment, instant message data may be used to provide additional information for such applications.

According to one embodiment, it may be desirable that one or more of these functions may be performed by an automated system that interprets such instant messages. According to one aspect, it may be beneficial to add structure to instant messages to perform additional functions, such as display, control and/or handling of instant messages and the trading information that they hold. Because instant messages can be structured, applications may be capable of processing such instant messages in an efficient manner. Further, tools may be provided that leverage such structures so that users may more easily view instant message information.

According to one aspect of the present invention, in a distributed computer system, a method for processing instant message information is provided. The method comprises acts of at a client computer, permitting a user to create at least one instant message, the at least one message having a plurality of unstructured content, generating, at the client computer, at least one portion of structured content, inserting the at least one portion of structured content within the at least one instant message, and transmitting the at least one instant message to a destination. According to one embodiment of the present invention, the act of generating includes determining, based on an input of a user at the client computer, the at least one portion of structured content. According to another embodiment of the present invention, the act of generating further includes acts of receiving an element of structure from the user through an interface of an instant messaging application, and inserting the element of structure in the at least one message. According to another embodiment of the invention, the method further comprises an act of processing the unstructured content and identifying at least one attribute within the unstructured content, and wherein the act of inserting further comprises an act of inserting the at least one identified attribute within the at least one instant message. According to another embodiment of the invention, the act inserting the at least one portion of structured content includes an act of inserting a code.

According to one embodiment of the present invention, the code describes a format of the unstructured content. According to another embodiment of the invention, the code describes an action to be taken by the destination. According to another embodiment of the invention, the code includes one or more codes that identify the locations of one or more elements residing within the unstructured content. According to another embodiment of the invention, the method further comprises acts of processing the unstructured content and modifying the unstructured content responsive to act of processing the unstructured content. According to another embodiment of the invention, the method further comprises an act of formatting the unstructured context responsive to the act of processing the unstructured content. According to another embodiment of the invention, the act of processing the unstructured content further comprises an act of parsing the unstructured content. According to another embodiment of the invention, the act of parsing the unstructured content is performed at the client computer.

According to one embodiment of the present invention, the act of transmitting further comprises an act of sending the at least one instant message to an instant messaging network. According to another embodiment of the invention, the method further comprises an act of receiving, at another client computer system, the at least one instant message, and displaying information contained in the at least one instant message in a manner responsive to the structured content. According to another embodiment of the invention, the act of inserting the code, includes an act of inserting the code in an area of the at least one instant message that is not made visible to a user of an instant message application program. According to another embodiment of the invention, the method further comprises an act of determining a type of instant message application program that receives the at least one instant message, and wherein the act of inserting the code in the area of the at least one instant message includes selectively inserting the code in the message responsive to the determined type of instant message application program.

According to one aspect of the present invention, a client computer system comprises means for permitting a user to create at least one instant message, the at least one message having a plurality of unstructured content, means for generating, at the client computer, at least one portion of structured content, means for inserting the at least one portion of structured content within the at least one instant message, and means for transmitting the at least one instant message to a destination. According to one embodiment of the present invention, the means for generating includes means for determining, based on an input of a user at the client computer, the at least one portion of structured content. According to another embodiment of the invention, the means for generating further includes means for receiving an element of structure from the user through an interface of an instant messaging application, and means for inserting the element of structure in the at least one message. According to another embodiment of the invention, the client computer system further comprises means for processing the unstructured content and identifying at least one attribute within the unstructured content, and wherein the means for inserting further comprises means for inserting the at least one identified attribute within the at least one instant message. According to another embodiment of the invention, the means for inserting the at least one portion of structured content includes means for inserting a code.

According to one embodiment of the present invention, the code describes a format of the unstructured content. According to another embodiment of the invention, the code describes an action to be taken by the destination. According to another embodiment of the invention, the code includes one or more codes that identify the locations of one or more elements residing within the unstructured content. According to another embodiment of the invention, the client computer system further comprises acts of processing the unstructured content and modifying the unstructured content responsive to the means for processing the unstructured content. According to another embodiment of the invention, the client computer system further comprises means for formatting the unstructured context responsive to the means for processing the unstructured content. According to another embodiment of the invention, the means for processing the unstructured content further comprises means for parsing the unstructured content. According to another embodiment of the invention, the means for parsing the unstructured content is performed at the client computer. According to another embodiment of the invention, the means for transmitting further comprises means for sending the at least one instant message to an instant messaging network. According to another embodiment of the invention, the client computer system further comprises means for receiving, at another client computer system, the at least one instant message, and displaying information contained in the at least one instant message in a manner responsive to the structured content.

According to one embodiment of the present invention, the means for inserting the code, includes means for inserting the code in an area of the at least one instant message that is not made visible to a user of an instant message application program. According to another embodiment of the invention, the client computer system further comprises means for determining a type of instant message application program that receives the at least one instant message, and wherein the means for inserting the code in the area of the at least one instant message includes selectively inserting the code in the message responsive to the determined type of instant message application program.

According to one aspect of the present invention, a computer-readable medium comprising instructions that, when executed by a computer system, performs a method for processing instant message information.

According to one aspect of the present invention, in a distributed computer system, a method for processing instant message information is provided. The method comprises acts of at a receiver, receiving at least one instant message, the at least one message having a plurality of unstructured content and at least one portion of structured content, decoding the at least one portion of structured content within the at least one instant message, and performing an action responsive to the decoded structured content. According to one embodiment of the present invention, the receiver of the at least one instant message includes an instant message processor. According to another embodiment of the invention, the receiver of the at least one instant message includes a destination entity. According to another embodiment of the invention, the destination entity is at least one of a group comprising an intermediate system, an end system, a client computer system, a server, an application, a database, and a network. According to another embodiment of the invention, the at least one portion of structured content includes a code. According to another embodiment of the invention, the code identifies at least one attribute within the plurality of unstructured content. According to another embodiment of the invention, the code describes a format of the unstructured content. According to another embodiment of the invention, the code describes an action to be taken by the receiver of the at least one instant message. According to another embodiment of the invention, the code identifies a location of at least one element residing within the plurality of unstructured content.

According to one embodiment of the present invention, the method further comprises acts of identifying a conversation associated with the at least one instant message, and displaying, at the receiver, to a user within an interface of a display of the receiver, information relating to the plurality of conversations. According to another embodiment of the invention, the method further comprises an act of displaying, in respective rows of a message grid, the information relating to the plurality of conversations. According to another embodiment of the invention, the method further comprises an act of displaying, responsive to receiving the code, at least one portion of the unstructured message in a particular row of the message grid associated with the respective conversation.

According to one aspect of the present invention, a computer system comprises means for receiving at least one instant message, the at least one message having a plurality of unstructured content and at least one portion of structured content, means for decoding the at least one portion of structured content within the at least one instant message, and means for performing an action responsive to the decoded structured content. According to one embodiment of the present invention, the receiver of the at least one instant message includes an instant message processor. According to another embodiment of the invention, the receiver of the at least one instant message includes a destination entity. According to another embodiment of the invention, the destination entity is at least one of a group comprising an intermediate system, an end system, a client computer system, a server, an application, a database, and a network. According to another embodiment of the invention, the at least one portion of structured content includes a code. According to another embodiment of the invention, the code identifies at least one attribute within the plurality of unstructured content. According to another embodiment of the invention, the code describes a format of the unstructured content. According to another embodiment of the invention, the code describes an action to be taken by the receiver of the at least one instant message. According to another embodiment of the invention, the code identifies a location of at least one element residing within the plurality of unstructured content. According to another embodiment of the invention, the computer system further comprises means for identifying a conversation associated with the at least one instant message, and means for displaying, at the receiver, to a user within an interface of a display of the receiver, information relating to the plurality of conversations. According to another embodiment of the invention, the computer system further comprises means for displaying, in respective rows of a message grid, the information relating to the plurality of conversations. According to another embodiment of the invention, the computer system further comprises means for displaying, responsive to receiving the code, at least one portion of the unstructured message in a particular row of the message grid associated with the respective conversation.

According to one aspect of the present invention, a computer-readable medium comprising instructions that, when executed by a computer system, performs a method for processing instant message information.

According to one aspect of the present invention, in a distributed computer system, a method for processing instant message information is provided. The method comprises act of receiving at least one instant message originated at a client computer, the at least one message having a plurality of unstructured content, processing the unstructured content and identifying at least one attribute within the unstructured content, modifying the received at least one instant message to include structured content including the at least one identified attribute, and forwarding the modified at least one instant message to a destination. According to one embodiment of the present invention, the act of modifying includes an act of inserting a code that describes a format of the unstructured content. According to another embodiment of the invention, the code includes one or more codes that identify the locations of one or more elements residing within the unstructured content. According to another embodiment of the invention, the method further comprises an act of modifying the unstructured content responsive to the act of processing the unstructured content. According to another embodiment of the invention, the method further comprises an act of formatting the unstructured context responsive to the act of processing the unstructured content. According to another embodiment of the invention, the method further comprises an act of parsing the unstructured content. According to another embodiment of the invention, the act of parsing the unstructured content is performed by an instant message processor. According to another embodiment of the invention, the act of forwarding further comprises an act of sending the at least one instant message to an instant messaging network. According to another embodiment of the invention, the method further comprises an act of receiving, at a client computer system, the modified at least one instant message, and displaying information contained in the modified at least one instant message in a manner responsive to the structured content including the at least one identified attribute.

According to one embodiment of the present invention, the method further comprises an act of forwarding the modified at least one instant message to a destination responsive to the structured content including the at least one identified attribute. According to another embodiment of the invention, the method further comprises an act of displaying information contained in the modified at least one instant message in a message grid responsive to the structured content including the at least one identified attribute. According to another embodiment of the invention, the method further comprises acts of receiving, at the destination, a plurality of instant messages from a plurality of users, identifying a plurality of conversations, each of which is associated with at least one of the plurality of users, and displaying an interface that shows a user of the client computer information relating to of the plurality of conversations. According to another embodiment of the invention, the method further comprises an act of displaying, in respective rows of a message grid, the information relating to the plurality of conversations. According to another embodiment of the invention, the method further comprises an act of displaying, responsive to the structured content including the at least one identified attribute, at least one portion of the unstructured message in a particular row of the message grid associated with a respective conversation. According to another embodiment of the invention, the method further comprises an act of displaying at least one portion of the unstructured message in a display responsive to the structured content including the at least one identified attribute. According to another embodiment of the invention, the method further comprises an act of determining a formatting of the unstructured message in the display responsive to the structured content including the at least one identified attribute. According to another embodiment of the invention, the distributed computer system includes a securities trading system, and wherein the securities trading system is responsive to the structured content including the at least one identified attribute.

According to one embodiment of the present invention, the method further comprises an act of parsing a character string included in a body of the at least one instant message. According to another embodiment of the invention, the act of inserting the code that describes a format of the unstructured content includes an act of inserting the code in an area of the at least one instant message that is not visible to a receiving instant message application program.

According to one aspect of the present invention, a computer system including an instant message processor is provided. The processor comprises means for receiving at least one instant message originated at a client computer, the at least one message having a plurality of unstructured content, means for processing the unstructured content and identifying at least one attribute within the unstructured content, means for modifying the received at least one instant message to include structured content including the at least one identified attribute, and means for forwarding the modified at least one instant message to a destination. According to one embodiment of the present invention, means for modifying includes means for inserting a code that describes a format of the unstructured content. According to another embodiment of the invention, the code includes one or more codes that identify the locations of one or more elements residing within the unstructured content. According to another embodiment of the invention, the computer system further comprises means for modifying the unstructured content responsive to the act of processing the unstructured content. According to another embodiment of the invention, the computer system further comprises means for formatting the unstructured context responsive to the act of processing the unstructured content. According to another embodiment of the invention, the computer system further comprises means for parsing the unstructured content. According to another embodiment of the invention, the act of parsing the unstructured content is performed by an instant message processor. According to another embodiment of the invention, the act of forwarding further comprises means for sending the at least one instant message to an instant messaging network.

According to one embodiment of the present invention, the computer system further comprises means for receiving, at a client computer system, the modified at least one instant message, and displaying information contained in the modified at least one instant message in a manner responsive to the structured content including the at least one identified attribute. According to another embodiment of the invention, the computer system further comprises means for forwarding the modified at least one instant message to a destination responsive to the structured content including the at least one identified attribute. According to another embodiment of the invention, the computer system further comprises means for displaying information contained in the modified at least one instant message in a message grid responsive to the structured content including the at least one identified attribute. According to another embodiment of the invention, the computer system further comprises acts of receiving, at the destination, a plurality of instant messages from a plurality of users, identifying a plurality of conversations, each of which is associated with at least one of the plurality of users, and displaying an interface that shows a user of the client computer information relating to the plurality of conversations. According to another embodiment of the invention, the computer system further comprises means for displaying, in respective rows of a message grid, the information relating to the plurality of conversations. According to another embodiment of the invention, the computer system further comprises means for displaying, responsive to the structured content including the at least one identified attribute, at least one portion of the unstructured message in a particular row of the message grid associated with a respective conversation. According to another embodiment of the invention, the computer system further comprises means for displaying at least one portion of the unstructured message in a display responsive to the structured content including the at least one identified attribute.

According to one embodiment of the present invention, the computer system further comprises means for determining a formatting of the unstructured message in the display responsive to the structured content including the at least one identified attribute. According to another embodiment of the invention, the distributed computer system includes a securities trading system, and wherein the securities trading system is responsive to the structured content including the at least one identified attribute. According to another embodiment of the invention, the computer system further comprises means for parsing a character string included in a body of the at least one instant message. According to another embodiment of the invention, the means for inserting the code that describes a format of the unstructured content includes means for inserting the code in an area of the at least one instant message that is not visible to a receiving instant message application program.

According to one aspect of the present invention, a computer-readable medium comprising instructions that, when executed by a computer system, performs a method for processing instant message information.

According to one aspect of the present invention, a computer system comprises an instant message processor, the processor further comprises a storage entity adapted to store a plurality of received instant messages, a parser adapted to parse at least one received instant message, the at least one received instant message including a plurality of unstructured content, and a formatter adapted to format the at least one received instant message according to at least one formatting rule and create at least one modified instant message. According to one embodiment of the present invention, the parser is adapted to identify at least one attribute within the plurality of unstructured content. According to another embodiment of the invention, the formatter is adapted to include content including the at least one identified attribute. According to another embodiment of the invention, the formatter is adapted to insert a code into the at least one modified instant message. According to another embodiment of the invention, the code includes one or more codes that identify the location of one or more elements residing within the plurality of unstructured content.

According to one aspect of the present invention, in a distributed computer system, a method for processing instant message information is provided. The method comprises acts of receiving, at a client computer, a plurality of instant messages from a plurality of users, identifying a plurality of conversations, each of which is associated with at least one of the plurality of users, and displaying an interface that shows a user of the client computer information relating to the plurality of conversations. According to one embodiment of the present invention, the method further comprises an act of displaying, in respective rows of a message grid, the information relating to the plurality of conversations. According to another embodiment of the invention, the act of receiving the plurality of instant messages includes an act of receiving at least one instant message having modified information having structured content including at least one attribute identified from unstructured content of the at least one instant message. According to another embodiment of the invention, the method further comprises an act of displaying, responsive to the structured content including the at least one identified attribute, at least one portion of the unstructured message in a particular row of the message grid associated with a respective conversation. According to another embodiment of the invention, the method further comprises an act of displaying at least one portion of the unstructured message in a display responsive to the structured content including the at least one identified attribute. According to another embodiment of the invention, the method further comprises an act of determining a formatting of the unstructured message in the display responsive to the structured content including the at least one identified attribute. According to another embodiment of the invention, the distributed computer system includes a securities trading system, and wherein the securities trading system is responsive to the structured content including the at least one identified attribute.

According to one embodiment of the present invention, the method further comprises an act of modifying a display attribute of the display responsive to the structured content including the at least one identified attribute. According to another embodiment of the invention, the display attribute is an attribute of a message grid, and wherein the display attribute of the message grid is controlled responsive to the structured content including the at least one identified attribute. According to another embodiment of the invention, the structured content is inserted in a predetermined area in the at least one instant message, wherein the information within the predetermined area does not affect a presentation of the instant message within a display of an instant message application program. According to another embodiment of the invention, the structured content is selectively inserted by an instant message processor in the predetermined area based on a type of an instant message application program being executed at the client computer.

According to one embodiment of the present invention, a distributed computer system including a client computer system comprises means for receiving, at the client computer system, a plurality of instant messages from a plurality of users, means for identifying a plurality of conversations, each of which is associated with at least one of the plurality of users, and means for displaying an interface that shows a user of the client computer information relating to the plurality of conversations. According to one embodiment of the present invention, the computer system further comprises means for displaying, in respective rows of a message grid, the information relating to the plurality of conversations. According to another embodiment of the invention, the means for receiving the plurality of instant messages includes means for receiving at least one instant message having modified information having structured content including at least one attribute identified from unstructured content of the at least one instant message. According to another embodiment of the invention, the computer system further comprises means for displaying, responsive to the structured content including the at least one identified attribute, at least one portion of the unstructured message in a particular row of the message grid associated with a respective conversation. According to another embodiment of the invention, the computer system further comprises means for displaying at least one portion of the unstructured message in a display responsive to the structured content including the at least one identified attribute. According to another embodiment of the invention, the computer system further comprises means for determining a formatting of the unstructured message in the display responsive to the structured content including the at least one identified attribute.

According to one embodiment of the present invention, the distributed computer system includes a securities trading system, and wherein the securities trading system is responsive to the structured content including the at least one identified attribute. According to another embodiment of the invention, the computer system further comprises means for modifying a display attribute of the display responsive to the structured content including the at least one identified attribute. According to another embodiment of the invention, the display attribute is an attribute of a message grid, and wherein the display of attribute of the message grid is controlled responsive to the structured content including the at least one identified attribute. According to another embodiment of the invention, the structured content is inserted in a predetermined area in the at least one instant message, wherein the information within the predetermined area does not affect a presentation of the instant message within a display of an instant message application program. According to another embodiment of the invention, the structured content is selectively inserted by an instant message processor in the predetermined area based on a type of an instant message application program being executed at the client computer.

According to one aspect of the present invention, a computer-readable medium comprising instructions that, when executed by a computer system, performs a method a method for processing instant message information.

BRIEF DESCRIPTION OF THE DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 6C shows an example processing of a received message according to one embodiment of the present invention;

FIG. 8 shows an example message processing according to one embodiment of the present invention;

DETAILED DESCRIPTION

Figure 1:
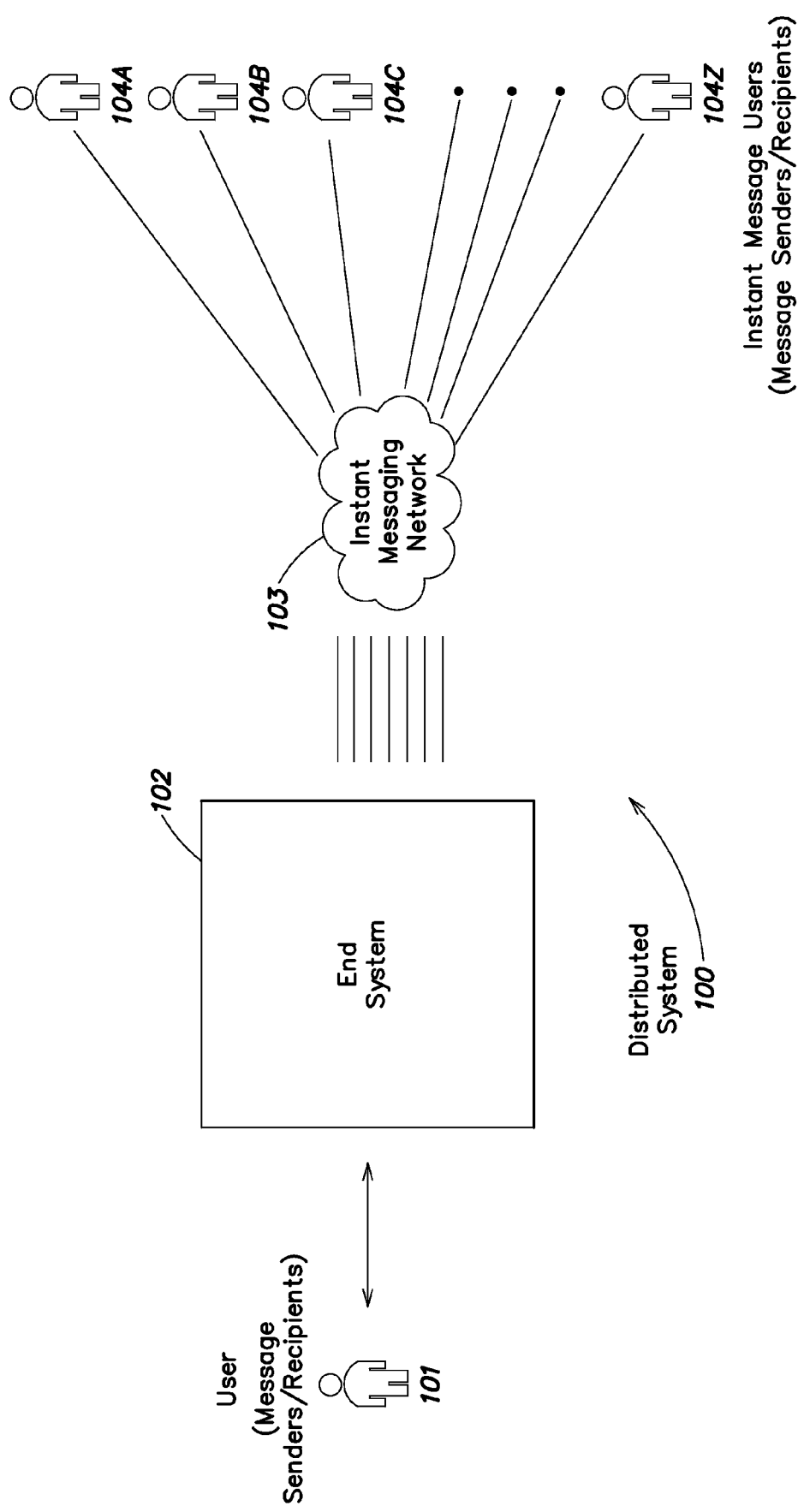
FIG. 1 is a block diagram of a distributed system in which various aspects of the present invention may be practiced.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, aspects of the present invention relate to using instant messaging for performing trading functions within trading system. It should be appreciated, however, that various aspects may be used in other systems that implement instant messaging functions. Other aspects of the present invention relate to using structured message information to perform functions in a distributed instant messaging system.

FIG. 1 shows an example distributed messaging system 100 in which various aspects of the present invention may be practiced. As shown, the user 101 sends and receives messages using an end system 102 that communicates the messages to/from more other instant message users 104A-104Z through an instant messaging network 103. System 100 may include any number of users 104, instant messaging network types, systems, and/or end system types. End system 102 may be, for example, a personal computer (PC), cell phone, PDA, or other type of system capable of creating, sending, and receiving instant messages. Also, it should be appreciated that messages may be originated by multiple entities, which may be different types of entities.

Generally, a user may be provided with one or more computer interfaces in which the user can compose and send instant messages to other users as well as receive and view instant messages. As discussed, conventional instant messages are used to send unstructured text information between users. According to one embodiment of the present invention, an instant messaging processor is provided that is capable of modifying unstructured messages to create structured messages which can be used to perform functions in the distributed instant messaging network.

Figure 2:
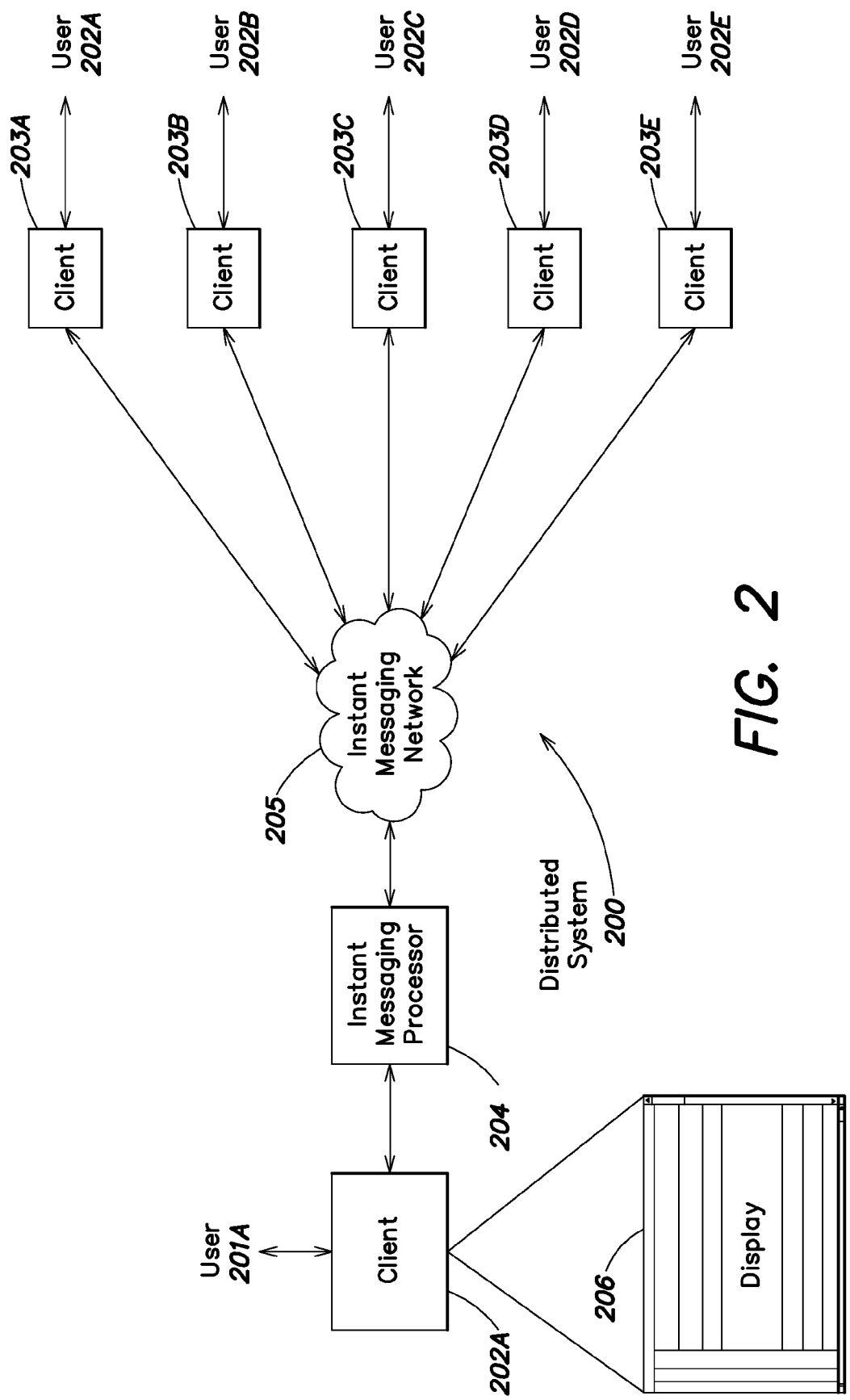
FIG. 2 shows a block diagram of a distributed system according to one embodiment of the present invention including an instant messaging processor.

FIG. 2 shows a distributed system 200 that may use structured instant messages according to various aspects of the present invention. In one embodiment, systems (e.g., client systems, server systems, applications, or other entities) may be modified to send, receive, and process structured instant messages. To this end, such systems may include the ability to create structure within an instant message (e.g., by encoding information in the instant message) and to process the structure within received messages.

For instance, a client, application, system or other entity may include a program (e.g., an instant messaging application program) that is configured to create and process instant messages having structured information. In one example, a specialized instant message application program may be adapted to create structured information within instant messages that are communicated to other entities, and process received instant messages having structured information.

In yet another embodiment, a client system may provided that is capable of displaying information from multiple instant message conversations within a display of the client computer system. For instance, the client system may include an application program that is capable of interpreting instant message information from multiple instant messages and displaying extracted information from those instant messages in a display (e.g., display 206) of a client computer system. This program may, according to one embodiment, be configured to process instant messages, extract information, and display information relating to particular conversations within specified areas of the display.

In another embodiment, a distributed computer system includes an instant messaging processor (e.g., processor 204) which is capable of producing structured instant messages from unstructured instant messages that are received from various entities. For instance, instant messaging processor 204 may be an intermediate system capable of receiving unstructured instant messages from one or more entities, modifying the instant messages to include structure, and sending the modified instant messages to one or more destinations. According to one embodiment, it may be useful for an intermediate system to add structure to an unstructured message stream.

Distributed system 200 includes a user 201A operating a client computer 202A. Client computer 202A includes an interface that permits user 201A to create and send an instant message to another user (e.g., user 202A). One or more users 202A-202E may be the intended (or unintended) recipients of the instant message, and these users may themselves create, send and view instant messages on one or more client computer systems 203A-203E. According to one embodiment, instant messaging processor 204 reviews unstructured content of an instant message and modifies the instant message to include one or more structured attributes.

These attributes may be used by another computer, process, or user to perform one or more functions or handle the instant message and its content in a particular way. As discussed above, instant messages may be used as a form of communication to permit instant messages to be processed in a particular way or cause certain actions to be performed. For instance, structured messages received by a client may be rendered in any way that makes it easier for the end user to locate information of interest. For instance, received messages can be displayed in a tabular view wherein discrete attributes identified by the structured instant message can be organized within the tabular view.

In another example, structured messages received by an instant messaging application executing on a computer system can be used to direct where the instant message is sent. For instance, in a trading application, the ticker symbol "IBM" may be recognized from unstructured text within the instant message, and structured information indicating this symbol can be added to the instant message. A computer system that receives and processes instant messages can be configured to respond to this particular symbol, and direct the instant message to a number of traders and/or systems that cover ticker symbol "IBM."

In yet another example, it is appreciated that although instant messaging is used by users to convey business critical data, it is generally unusable by other applications because the content has no structure and therefore is not semantically parsable. By adding structure to the instant message, applications such as pricing systems, risk management systems, order management systems, etc. can receive and process business critical data contained within the instant message because the modified instant message contains structure that can be easily parsed.

In yet another example, structured message information may be added to an instant message such that the normal display and operation of conventional instant message applications such as Yahoo! Messenger, AOL Instant Messenger (AIM), Microsoft's Messenger Services (MSN) instant messaging application program (e.g., Windows Live Messenger application program), and other application programs may function in their normal way, while still supporting other application program functions.

Figure 3A:
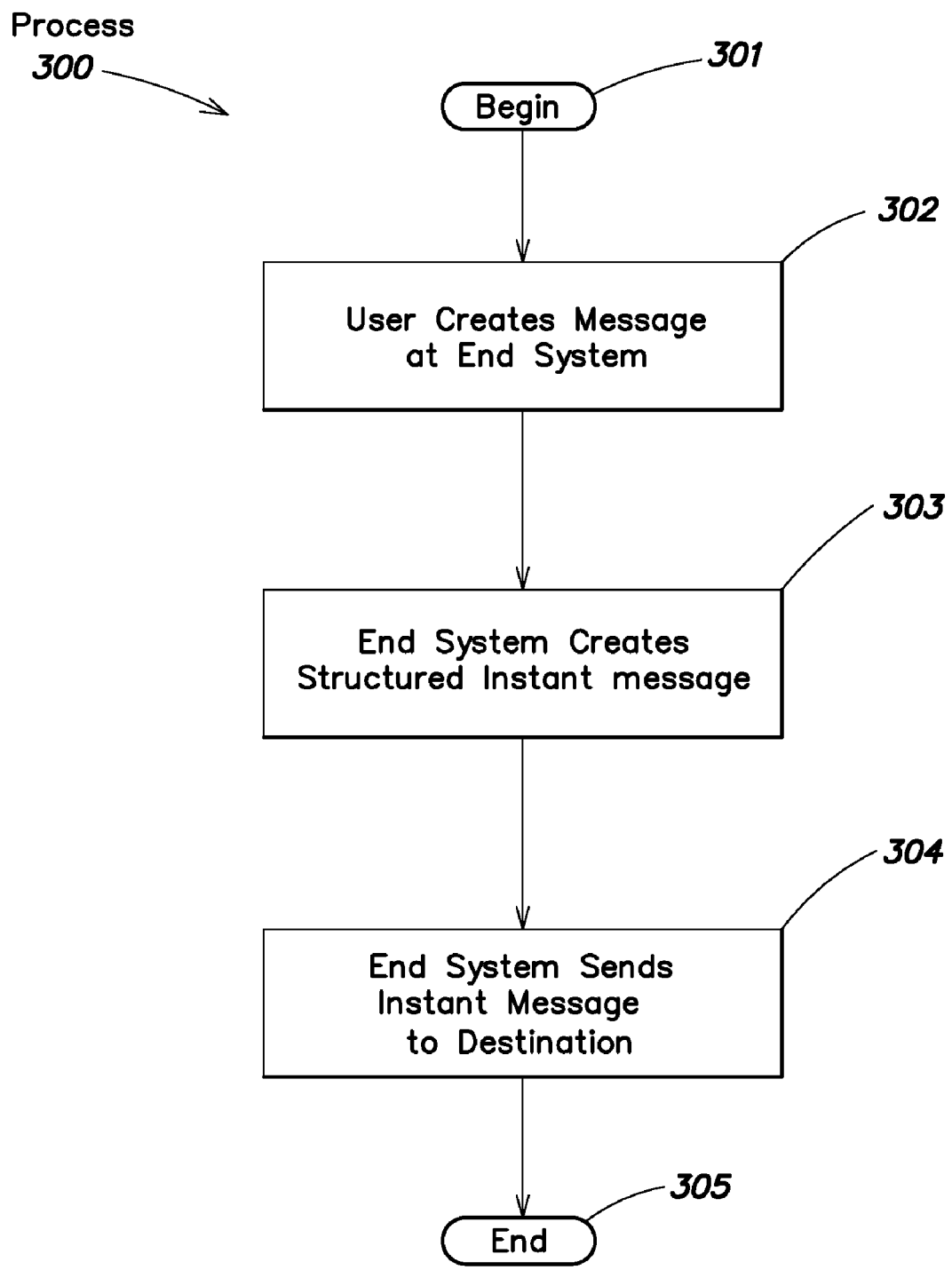
FIG. 3A shows a process for creating instant messages according to one embodiment of the present invention.

FIG. 3A shows one example process 300 processing on structured instant messages according to one embodiment of the present invention. At block 301, process 300 begins. At block 302, a user creates a message at an end system. For instance, the user may operate a client computer system (e.g., a personal computer (PC), Personal Digital Assistant (PDA), cell phone, or other computer system type) to create an instant message. As discussed above, such messages generally include unstructured text which does not have any particular format. Such text information may be entered in an application interface for creating instant messages, such as an instant message application program such as the Yahoo! Messenger, AIM, and Microsoft's Messenger Services (MSN) instant messaging application programs, among others.

At block 303, the end system creates structured information to be included within an instant message. For example, a client computer may include an instant message application program or other type of program that is capable of generating structured information within an instant message. The structured information may be determined, for example, from unstructured text by the user. In another example, the instant messaging application program may be capable of accepting structured information from a user, and encoding that information within the instant message. For instance, in an interface of the instant message application program, a user may enter a ticker symbol (e.g., "IBM"), select a menu option, dialog box, or provide any other type of input that, when interpreted by the instant message application program, causes the instant message application program to add structure to an instant message. Such interface controls may be separate from a regular "chat" window used to enter freeform text in a message, and may permit the user to add structure directly to the message.

At block 304, the end system sends the instant message to a destination. As discussed, instant messages may be transmitted to any number and type of destinations, including, but not limited to application programs, systems (e.g., clients, servers, etc.), databases, networks or other entity capable of processing structured information encoded within instant messages. At block 305, process 300 ends.

Figure 3B:
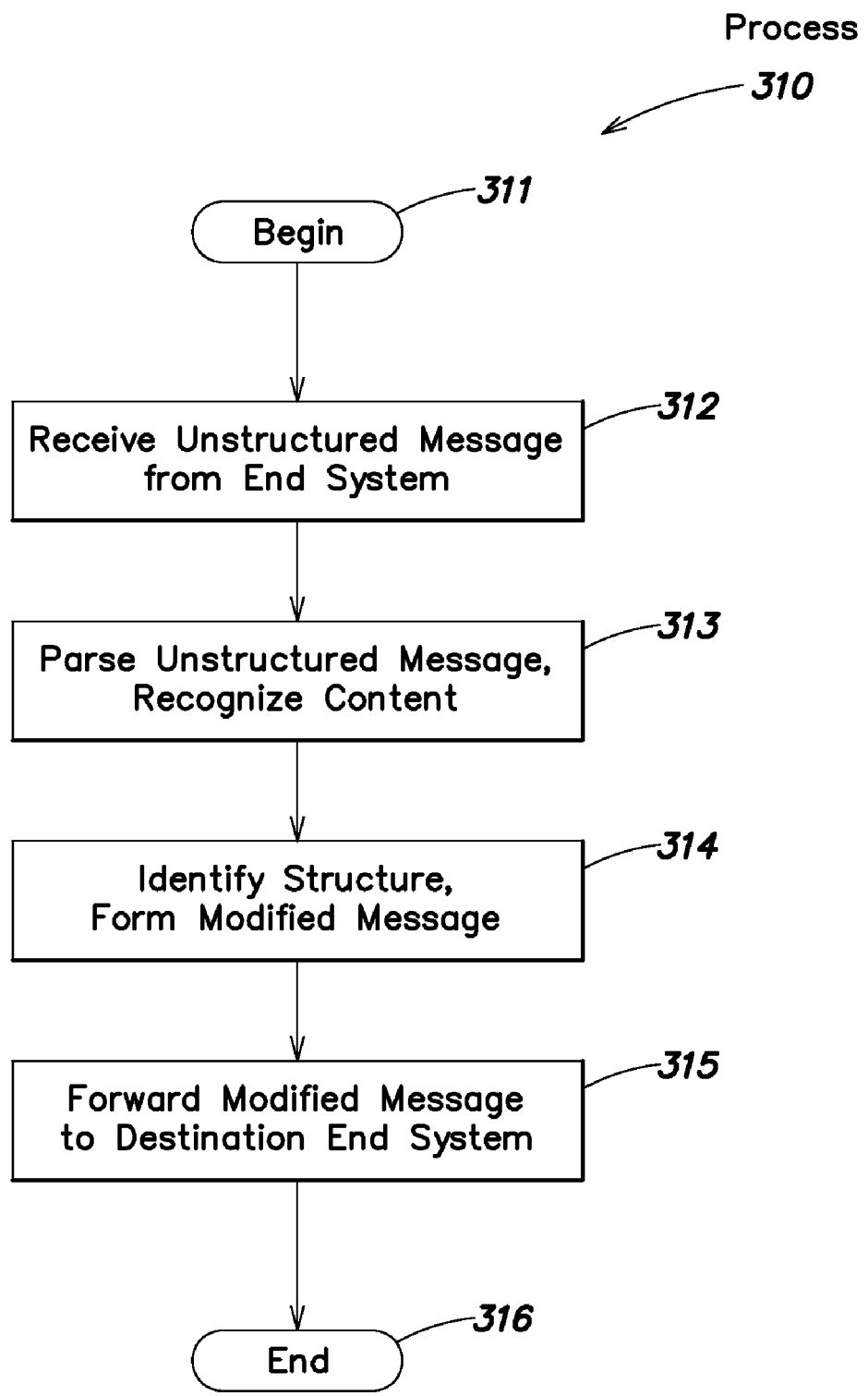
FIG. 3B shows a process for processing instant messages according to one embodiment of the present invention.

FIG. 3B shows one example process 310 processing on received structured instant messages according to one embodiment of the present invention. Such processing may be performed, for example, by an intermediate system having an instant message processor that adds structure to unstructured instant messages that are received by the intermediate system. At block 311, process 310 begins. At block 312, an instant messaging processor (e.g., instant messaging processor 204) receives an unstructured message from an end system (e.g., end system 102). At block 313, the instant messaging processor parses the unstructured message and identifies content within the unstructured text. To this end, instant messaging processor 204 may include a grammar which defines tokens which can be identified within the unstructured content.

For example, a user may send an instant message having unstructured text "Buy 100 IBM at 505." A parser configured to process the unstructured text may include a grammar that identifies the verb "buy", the ticker symbol "IBM" and the amounts relative to the verb and the ticker symbol. This identified information may be placed in a modified instant message to form a modified message (e.g., at block 314) and forwarded to one or more systems in the instant messaging network (e.g., networks 103, 205 or other networks) at block 315. At block 316, process 310 for processing the instant message ends. According to one embodiment, process 310 may continue indefinitely in order to process instant messages received from one or more client computer systems.

In the example below, an encoding scheme may be created that may be used for adding structure to instant messages. According to one embodiment, a minimal amount of information is added to an instant message to identify where, within the instant message text, information of relevance to a system, user, or application may be found. For instance, such information may be used to determine the behavior of a system that receives the instant message.

In the example above, an instant message may be received having the unstructured text "Buy 100 IBM at 505." A parser configured to analyze the unstructured text may be capable of identifying tokens such as ticker symbols (e.g., "IBM") and verbs in relation to those ticker symbols (e.g., the verb "Buy"). Amounts can be recognized in relation to the verbs and ticker symbols (e.g., buy "100" at "505").

According to one embodiment, structure may be encoded within the instant message to indicate where within the unstructured message the information may be found. In one example, the encoding may specify at what position within the unstructured text that tokens, verbs, amounts, etc. may be positioned. This position information may be placed within an outgoing instant message and sent to a receiver. The receiver may be configured to decode this position information and perform actions depending on the information encoded within the instant message.

In one implementation, single letters or other symbols are used to represent semantics within the unstructured message. For instance, the following semantics may be represented in the form <symbol1><length> <symbol2><length> . . . <symbolN><length> wherein symbol 1-N represents different types of elements found within the unstructured text of the instant message and the length indicates the length of the text within the message. For instance, an example coding approach may represent semantics by:

A—a verb recognized within the unstructured text
B—a recognized amount
C—a noun (e.g., a ticker symbol)
D—a recognized amount
F—a command to be executed by a receiver or other processing entity
E—a comment to be displayed to a user
Z—a semantic that indicates a certain number of characters in the message should be ignored or skipped
—a length of the identified semantic In the example above, "Buy 100 IBM at 505," the unstructured text may be represented as:

A3Z1B3Z1C3Z4D3

Where code A3 indicates the verb "Buy" having a text length of 3, the Z1 code indicates that one text character should be skipped, the code B3 indicates a recognized amount "100" having a character length of 3, and so on. Thus, the code may indicate where in the unstructured message relevant information appears, and this code may be used to affect processing of the instant message or to perform some other action. Although the above code is shown by way of example, it should be appreciated that other encoding techniques may be used to communicate information using instant messages.

This code, which describes where in the unstructured text the relevant information appears, can also be inserted into an outgoing instant message to a receiver. According to one embodiment, the code is inserted in an area of the message that does not affect a client application that does not understand the code. For instance, in the AOL IM application, there is a section of the instant message that is neither inspected by the AOL IM application nor is the information displayed within a window of the application. Other IM applications may use different areas of the IM message, and the message may be formatted selectively depending on the destination of the instant message.

In particular, using the AOL AIM application, it has been determined that encoded information may be included in an HTML comment area, as information in this area is not rendered within the interface of the AOL AIM client. In the Yahoo Instant Messenger application, however, it has been determined that typeface tags within an instant message may be used to encode information. For instance, the code may be encoded as the name of the typeface tag, and the typeface tag may be applied to the end of the message, as a typeface tag appearing at the end of a message does not change the typeface of any information previously within the message. Another issue with the Yahoo Instant Messenger application, is that typeface tags are automatically changed to lower case, and if a code is chosen that is case sensitive, another form of encoding may be necessary. Alternatively, the well-known uuencoding method may be used at a sender to encode the case-sensitive code information, and use uudecoding at a receiver to extract the case-sensitive code. Although the above encoding examples may be used to facilitate different aspects of the present invention, it should be appreciated that other coding methods may be used. Below are several coding examples that may be used with the Yahoo! Messenger and AOL AIM application programs.

In one coding example using the Yahoo! Messenger application program:

---

Sending "xz bos fence 99.75 @ 100" over Yahoo! as a structured message xz bos fence 99.75 @ 100<font face="pivot360"><font face="22413350315A3241375A3342325A3343335A3344355A3345355A3346335A3358
33335A323731313839414646344245313143433022202224E61742047617322022787A2
22022626F7322202266656E636522202239392E373522202231303022202243547970 65
5C745465726D5C745A6F6E655C74547970 655C744269645C7441736B2220">

---

The structure is embedded in the font face value of a <font face> tag. If the structure is attached at the end of the message, the added structure is ignored by a standard Yahoo! Messenger client because the tag is used to describe the font to be applied to the text string following the tag. The text in bold contains the message structure which is uuencoded in the following encoding:

---

<!DOCTYPE html PUBLIC
"A3P1Z2A7Z3B2Z3C3Z3D5Z3E5Z3F3Z3X33Z271189AFF4B-
E11CC0" "Nat Gas" "xz" "bos" "fence" "99.75" "100"
"CType\tTerm\tZone\tType\tBid\tAsk" >

---

In another coding example using the AOL IM application program, the message "xz bos fence 99.75@100" is sent over an AOL network as a structured message:

---

<HtmlText><!DOCTYPE html PUBLIC
"A3P1Z2A7Z3B2Z3C3Z3D5Z3E5Z3F3Z3X33Z271189AFF-
4BE11CC0" "Nat Gas" "xz" "bos" "fence" "99.75" "100"
"CType\tTerm\tZone\tType\tBid\tAsk" >xz bos fence 99.75 @ 100
</HtmlText>

---

The structure is embedded in a <!DOCTYPE> tag. An AOL AIM client ignores html meta tags such as <!DOCTYPE> and therefore these types of meta tags may be inserted within a message and may carry encoded information.

In this way, the encoding may be a self-describing format. If the encoding is upgraded at the instant messaging processor, certain codes may be added that are not understood at the receiving node. If the code is understood by a particular receiving node, an action may be performed as a result. If not, the receiving node may just ignore the message. Also, certain receiving node types may have one or more codes that they respond to, others that they ignore. For instance, a message code that relates to presentation of the information in the message grid may be ignored by a node that just forwards messages.

Further, an instant message processor according to one embodiment may be capable of modifying the unstructured content of a message. For instance, in the example above, if the amount "1000" is recognized in the unstructured text by the instant message processor, the unstructured text may be modified to read "1000 shares of" and the message may be sent on to the receiver in this format. In this way, the instant message processor may be capable of identifying meaning within instant messages and translating that meaning to presentation or actions to be performed by a receiving system. For instance, an instant message processor may inspect the term "IBM" and insert a command in a modified instant message to be sent to a user to ring a bell at the user's computer.

Figure 4A:
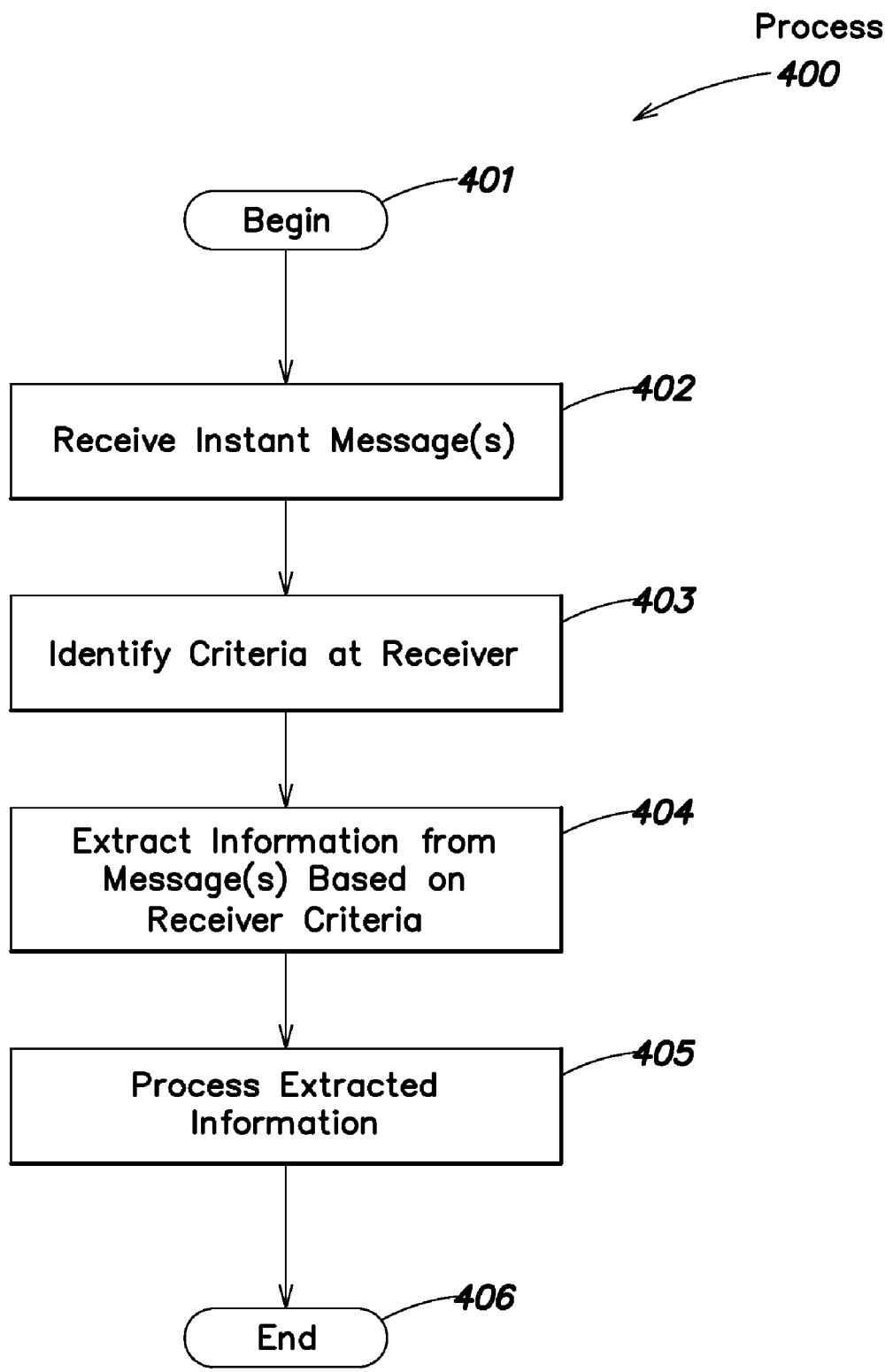
FIG. 4A shows a process for processing instant message information according to one embodiment of the present invention.

As discussed above, one more systems may be capable of using structured instant message information to perform various functions in relation to the received instant message. FIG. 4A shows one example of how structured message information may be used by a receiver of instant messages having structured information (e.g., as received by a client computer system 203A). At block 401, process 400 begins.

At block 402, a computer receives one or more instant messages (e.g., an instant message received at a client computer 203A). At block 403, when a more attributes or other criteria is identified within the instant message at the receiving system. At block 404, the client system is programmed to extract information from one of more instant messages based on criteria defined at the receiver. For instance, the client system may be programmed to identify the ticker symbol "IBM" and display information retrieved from message to a user. At block 405, the extracted information may be processed by the receiver. For instance, and as a result of this processing, the extracted information may be displayed, stored in a database, changed, cause one or more functions to be executed, cause the instant message to be transmitted to further destinations, or cause any other action to be performed at the receiving entity.

Figure 4B:
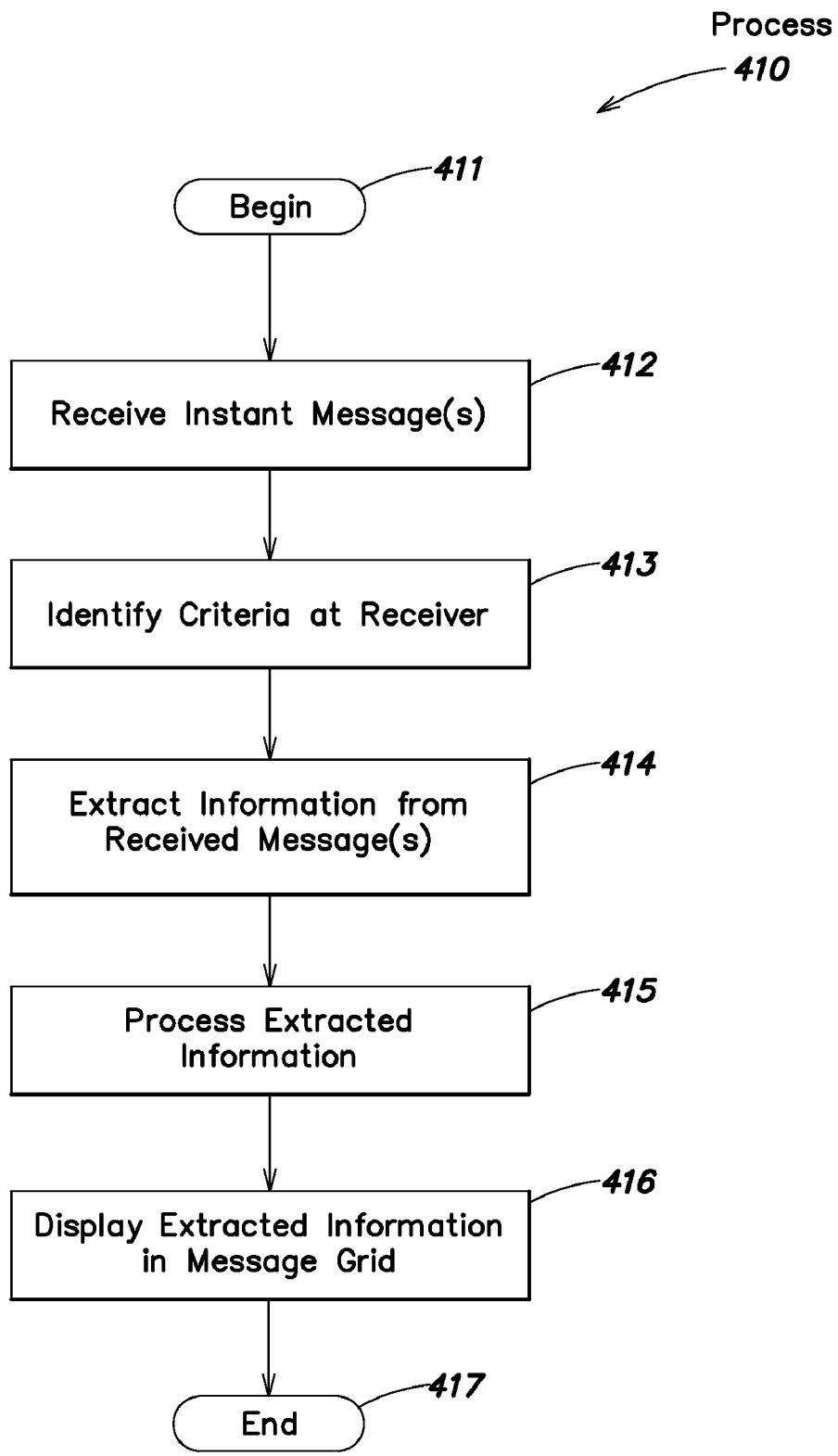
FIG. 4B shows an example interface for displaying instant message information to a user according to one embodiment of the present invention.

FIG. 4B shows one example of how structured message information may be used by a client computer system (e.g., client 203A) to display information to a user. At block 411, process 410 begins. At block 412, a computer receives one or more instant messages (e.g., an instant message received at a client computer 203A). At block 413, when a more attributes or other criteria is identified within the instant message at the receiving system. At block 414, the client system is programmed to extract information from one of more instant messages based on criteria defined at the receiver. For instance, the client system may be programmed to identify the ticker symbol "IBM" and display information retrieved from the message in a particular location within a message grid displayed to the user. At block 415, information within the structure message may be displayed to the user within a message grid as discussed above.

Further, an instant message processor according to one embodiment may be capable of determining the presentation of information in the message grid based on what structured information is added to the instant message. In one example below that displays information relevant to a Weather derivatives market, information may be encoded within in the HTML text of an instant message and adjusted based on what is desired to be displayed. Below is an example HTML text field of an instant message:

```
<HtmlText>
    <!DOCTYPE html PUBLIC
    "A2H1Z2A7Z3B6Z3C3Z3D225Z2">
"Weather"
"Modify"
"BKR"
"<H1 Loc1='BNS' Loc2=" Strx='C' Term='h' Muid='BNS
h 123 C (1x2K)##2008 HDD' Strike='123'
Strike2=" Tick='1' Tick2=" Limit='2' Limit2=" Swap="
Type='HDD' Year='2008' BID='234' BidSize='123' ASK='345'
AskSize='456'/>"
    > BNS h 123 C (1x2K) [123]234@345[456]
</HtmlText>
```

To take something of this format, the encoding type could be changed to A3 and an "X" attribute may be added to the encoding, the "X" attribute containing column definitions for the message grid that is displayed to the user (e.g., a message grid described below with reference to FIG. 5). In one example implementation, these column definitions do not contain spaces, and a '\t' tab character is used to denote the end of a column. To change the above example to include column definitions, the changes could appear similar to the following (changes are identified below in bold):

```
<HtmlText>
    <!DOCTYPE html PUBLIC
    "A3H1Z2A7Z3B6Z3C3Z3D225Z2X25Z2"
"Weather"
"Modify"
"BKR"
"<H1 Loc1='BNS' Loc2=" Strx='C' Term='h' Muid='BNS
h 123 C (1x2K)##2008 HDD' Strike='123' Strike2=" Tick='1'
Tick2=" Limit='2' Limit2=" Swap="
Type='HDD' Year='2008' BID='234' BidSize='123' ASK='345'
AskSize='456'/>"
"CType\tAction\tFirm\tData"
    > BNS h 123 C (1x2K) [123]234@345[456]
</HtmlText>
```

If it is desired to add more displayable pieces of data to the above example, the encoding could look like the following example (again, changes are shown below in bold):

```
<HtmlText>
    <!DOCTYPE html PUBLIC
    "A3H1Z2A7Z3B6Z3C3Z3D225Z2E3Z2F3Z2G3Z2H3Z2X53Z2"
"Weather"
"Modify"
"BKR"
"<H1 Loc1='BNS' Loc2=" Strx='C' Term='h' Muid='BNS
h 123 C (1x2K)##2008 HDD' Strike='123' Strike2=" Tick='1'
Tick2=" Limit='2' Limit2=" Swap="Type='HDD'
Year='2008' BID='234' BidSize='123' ASK='345' AskSize='456'/>"
"234"
"123"
"345"
"456"
"CType\tAction\tFirm\tData\tBid\tBidSize\tAsk\tAskSize"
    > BNS h 123 C (1x2K) [123]234@345[456]
</HtmlText>
```

Further, if it is desired to make a value in the DOCTYPE declaration invisible to the grid, the column name may be removed from the column definitions field. Taking the example above, and if it is desired to remove the "Data" field (which contains all of the data used in the Weather Derivatives market but the information does not need to appear in a "regular" grid), it would look as follows (changes are shown below in bold):

```
<HtmlText>
    <!DOCTYPE html PUBLIC
    "A3H1Z2A7Z3B6Z3C3Z3D225Z2E3Z2F3Z2G3Z2H3Z2X49Z2"
"Weather"
"Modify"
"BKR"
"<H1 Loc1='BNS' Loc2=" Strx='C' Term='h' Muid='BNS
h 123 C (1x2K)##2008 HDD' Strike='123' Strike2=" Tick='1'
Tick2=" Limit='2' Limit2=" Swap=" Type='HDD' Year='2008'
BID='234'BidSize='123'ASK='345' AskSize='456'/>"
"234"
"123"
"345"
"456"
"CType\tAction\tFirm\t\tBid\tBidSize\tAsk\tAskSize"
    > BNS h 123 C (1x2K) [123]234@345[456]
</HtmlText>
```

Thus, in this example, no column name between '\t' delimiters in the column field is interpreted to mean that the column is made invisible (e.g., not displayed in the message grid).

Thus, in summary, certain codes may be correlated with how the information may be displayed within the message grid. How the codes are created may be adjusted, for example, by an administrator that controls how the instance message processor parses and modifies instant messages, by the user, depending on how the user would like to view instant message information, by a set of rules, or other criteria.

Figure 5:
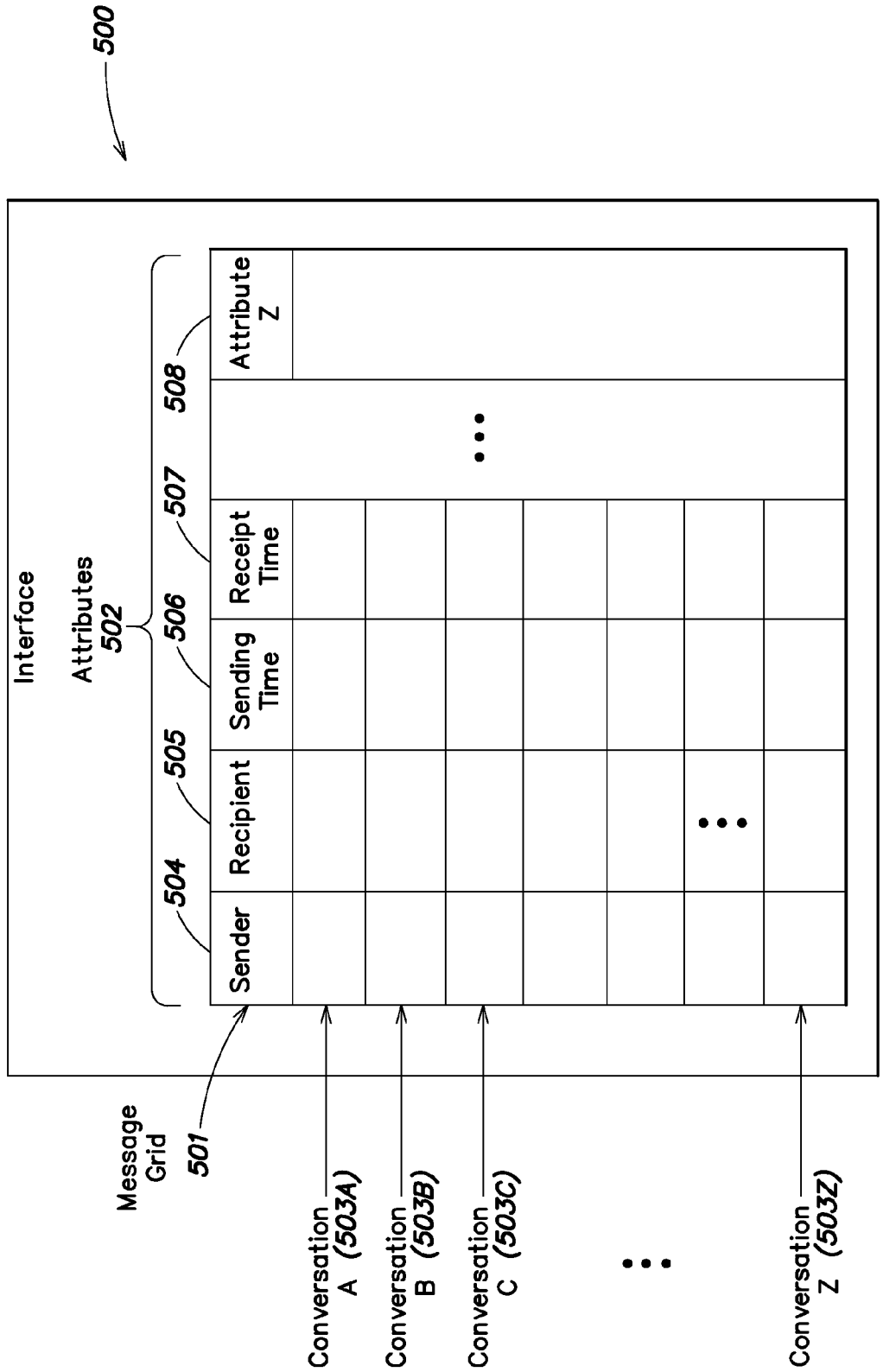
FIG. 5 shows an example interface for displaying instant message information according to one embodiment of the present invention.

FIG. 5 shows an example interface 500 for displaying instant message information to a user according to one embodiment of the present invention. In particular, interface 500 may include the ability to represent status information relating to a set of conversations within, for example, a message grid that is displayed to a user. In one example, interface 500 may dynamically create views that display information identified within messages. According to another embodiment, the way in which the information is displayed to the user is controlled based on the content of the conversation. For instance, unstructured text may be modified to include structured commands which define how the information is displayed within the interface of the computer system.

In one implementation, interface 500 may include a message grid 501 having a number of rows and columns. In one embodiment, message grid 501 may display one or more attributes 502 relating to the structured messages that are received. For instance, attributes such as the message sender, recipient, spending time, receipt time, or other attribute may be displayed within grid 501. One example, grid 501 may include individual columns 505-508 that correspond to various attributes that are displayed.

Further, according to one embodiment, message grid 501 may include rows associated with various conversations being maintained by a user on the client computer. As discussed, in a trading environment, a trader may be able to receive a number of different messages from various users relating to buy and sell orders to be placed in a trading system. Also, as discussed above, it may be useful to see the status of various instant messaging conversations within a single interface. To this end, a row may be assigned to a particular conversation (e.g., conversation A (element 503A)), and when messages are received relating to this conversation, the information displayed within the row may be updated. Other conversations (e.g., conversations B-Z (items 503B-503Z)) may also be tracked, and responsive to messages relating to those particular conversations, message grid 501 may be updated in the appropriate row and column.

Various aspects of message grid 501 may be activated based on information received within an instant message. For example, when an instant message is received that corresponds to one of the monitored conversations, the row associated with that conversation may be highlighted. Further, information extracted from structured message may cause various interface features to be enabled or disabled. For instance, if a buy order is received within a message (e.g., a particular verb is recognized from the message on structured text), a particular interface feature may be enabled, activated, disabled, or deactivated (e.g., the row entry of the conversation changes color). In another example, advertisements displayed to a user within the interface may be modified based on attributes identified within the structured message. For instance, if a person spends a buy order for ticker symbol IBM, an advertisement for IBM servers may be displayed within an application window displayed to the user.

Interface 500 may include other interface features, such as allowing a user to certain conversations (e.g., rows) to display the detailed exchange of messages which underlie the row entry. Grid 501 may also permit the user to search and/or organize grid entries based on one or more of attributes 502. Further, grid 501 may include an interface feature that permits a user to filter or otherwise selectively view sets of messages. For example, in a trading environment, a particular trader may wish to see conversation information relating to particular securities, sectors, tickers, markets, etc. or see particular conversations relating to clients whom they represent. To this end, interface 500 may include one or more controls (e.g., a dropdown menu, popup, or other control type) to permit the user to selectively enter attributes and/or other relations (e.g., rules) that determine what information is displayed by grid 501.

A client, process, application, or system may perform other actions responses to control information embedded in a structured instant message. As discussed above, a server that processes instant messages daily configured through route particular messages based on the structured information. In one example, messages having the ticker symbol IBM may be routed automatically through a number of different triggers that trade IBM securities. In another example, instant messages may be routed to different systems based on the information in the structured instant message. For example, a "buy" verb recognized within a particular instant message may cause that message to be routed to a verification server that is adapted to verify whether a particular order is to be placed.

Figure 6A:
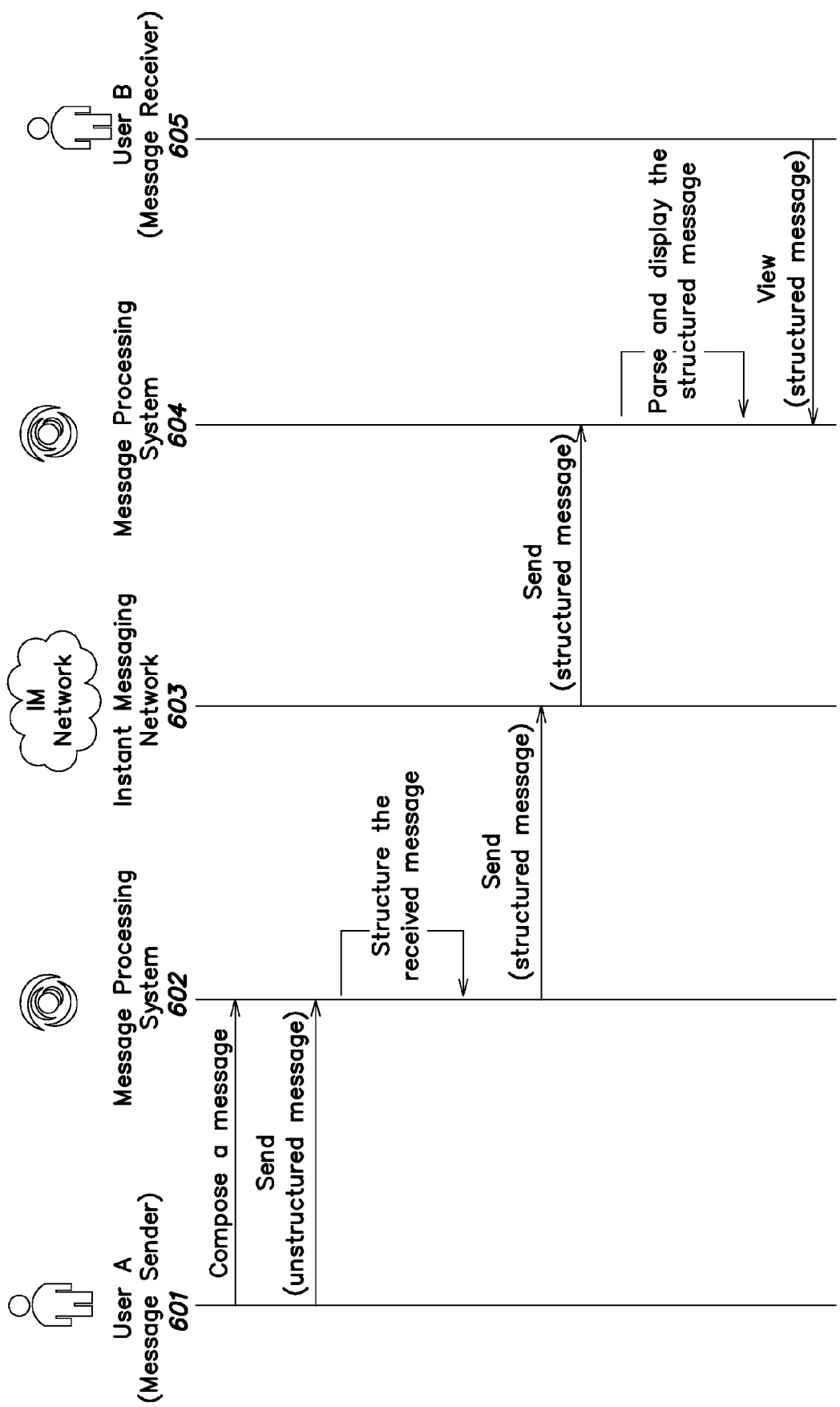
FIG. 6A shows one example message processing according to one embodiment of the present invention.

FIG. 6A shows one example message processing according to one embodiment of the present invention wherein unstructured messages are send from an end system (e.g., a user A 601 operating a client computer) which are then processed by an instant message processing system (e.g., system 602). In particular, FIG. 6A shows message flow between a number of users (user A 601 and user B 605). The flow typically begins with user a 601 composing a message to be sent to user B 605. The message may be created, for instance, using a conventional instant message application program that is not capable of generating structured information within instant messages. After creation, that message (the unstructured message) is sent to an instant message processing system 602 where it is received and processed.

At system 602, the received message is parsed to determine certain recognized elements and the received message is modified to incorporate structure. The modified message is sent to an instant messaging network 603 where it is forwarded to, according to one embodiment, another instant message processing system 604 which is configured to parse and display the structured message. Message processing system 604 may be capable of recognizing certain structured information within the message, and may display such information to user B, (e.g., such as within an interface 500 as discussed above with reference to FIG. 5). However, the application through which user views the instant message information may be a conventional instant message application that cannot recognize the included structured information. According to one embodiment, the application interface that displays the received instant message may not be effected by the included structured information.

Figure 6B:
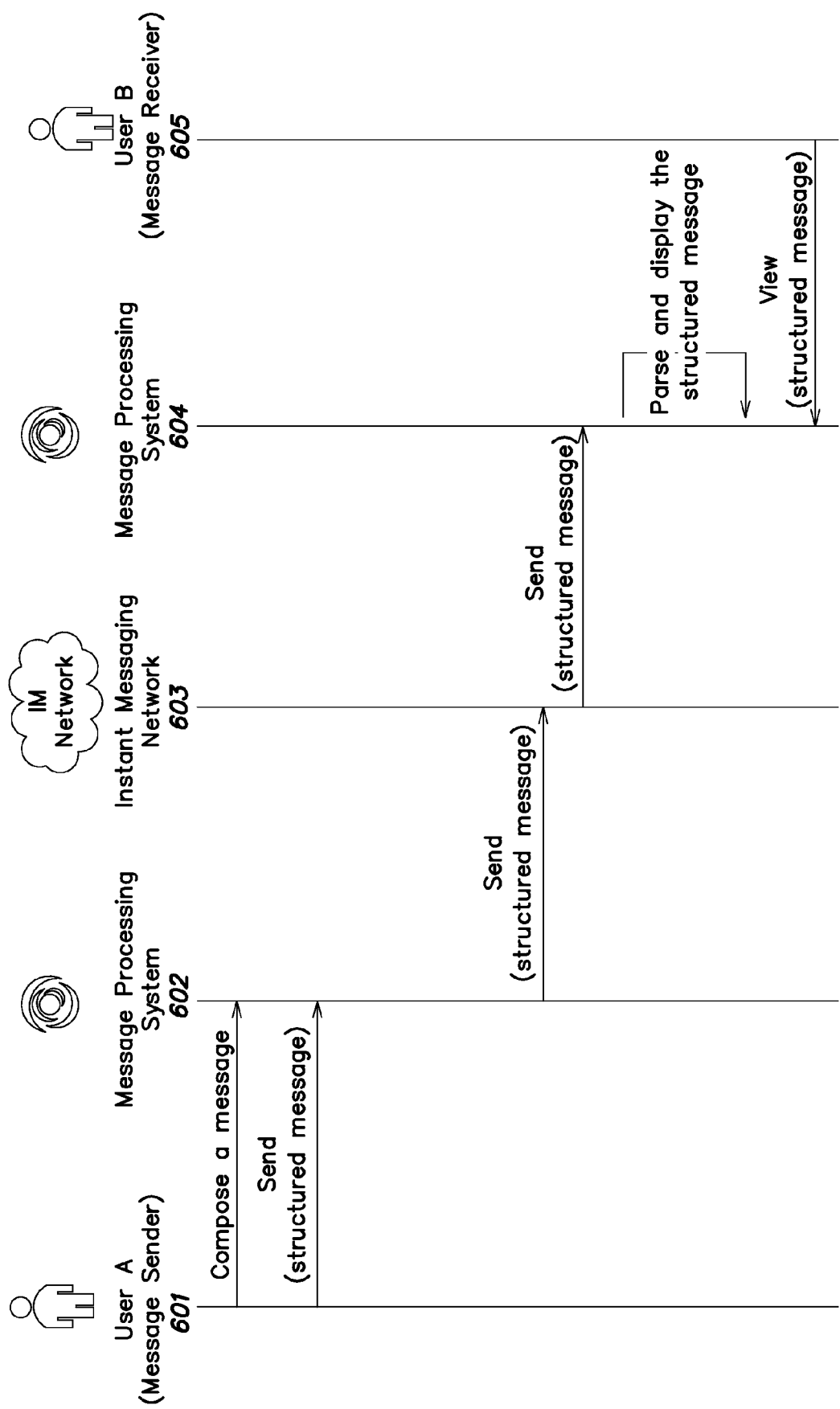
FIG. 6B shows another example message processing according to one embodiment of the present invention.

FIG. 6B shows a process similar to the process discussed above with reference to FIG. 6A, but in this case, the end system is capable of generating structured information natively within messages. For instance, a user A 601 creates an instant message having structure which is then sent to a user B. The structure may be created by the instant message application program or other application, and the structure may be encoded within the instant message as discussed above. The instant message may be transmitted through one or more instant messaging networks, or any number of intervening systems to a destination (e.g., to user B 605). Although transmission between client computer systems is shown by way of example, it should be appreciated that any type of sender or receiver may be used to communicate instant messages having structured information.

FIG. 6C shows a process wherein a destination entity (e.g., destination 606) receives a structured instant message having structured information. In response, the destination performs an action as a result of processing the instant message. For instance, the receiver may decode the structured information and display, route, store, modify, information within the instant message. Further, the destination may perform any number of functions or procedures in response to the encoded information.

Figure 6D:
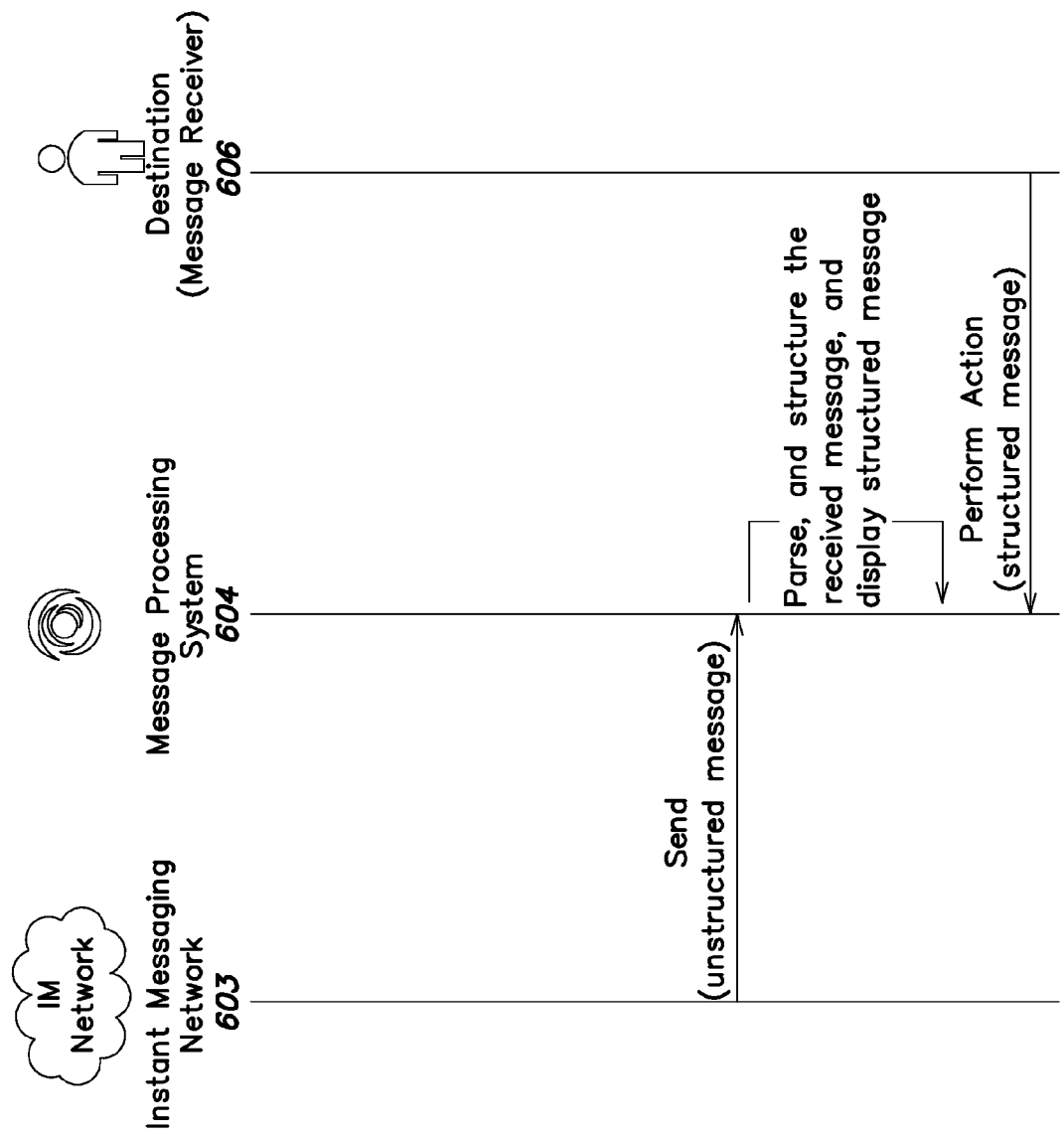
FIG. 6D shows another example processing of a received message according to one embodiment of the present invention.

FIG. 6D shows a process where a destination entity (e.g., destination 606) receives an unstructured instant message, yet has the capability to create structure. For instance, a conventional instant messaging application program (e.g., the AOL AIM application program) may generate unstructured instant messages which are then received in their unstructured format at a destination. According to one embodiment, the destination includes a capability of adding structure to received instant messages (or at least determining, based on unstructured content within the message, a desired structure of the unstructured instant message). In one implementation, an application program is provided at a destination (e.g., a client) that is adapted to take unstructured messages, parse the unstructured messages, identify structure, and perform one or more actions based on the identified structure. For instance, a client instant message application program may receive an unstructured instant message, recognize structure in the unstructured message, and perform one or more actions, such as presenting information of the instant message in a particular way in a client interface, reformatting the content of the displayed unstructured message, forwarding the unstructured (or now structured) message to other destinations, or any other type of action.

Figure 7:
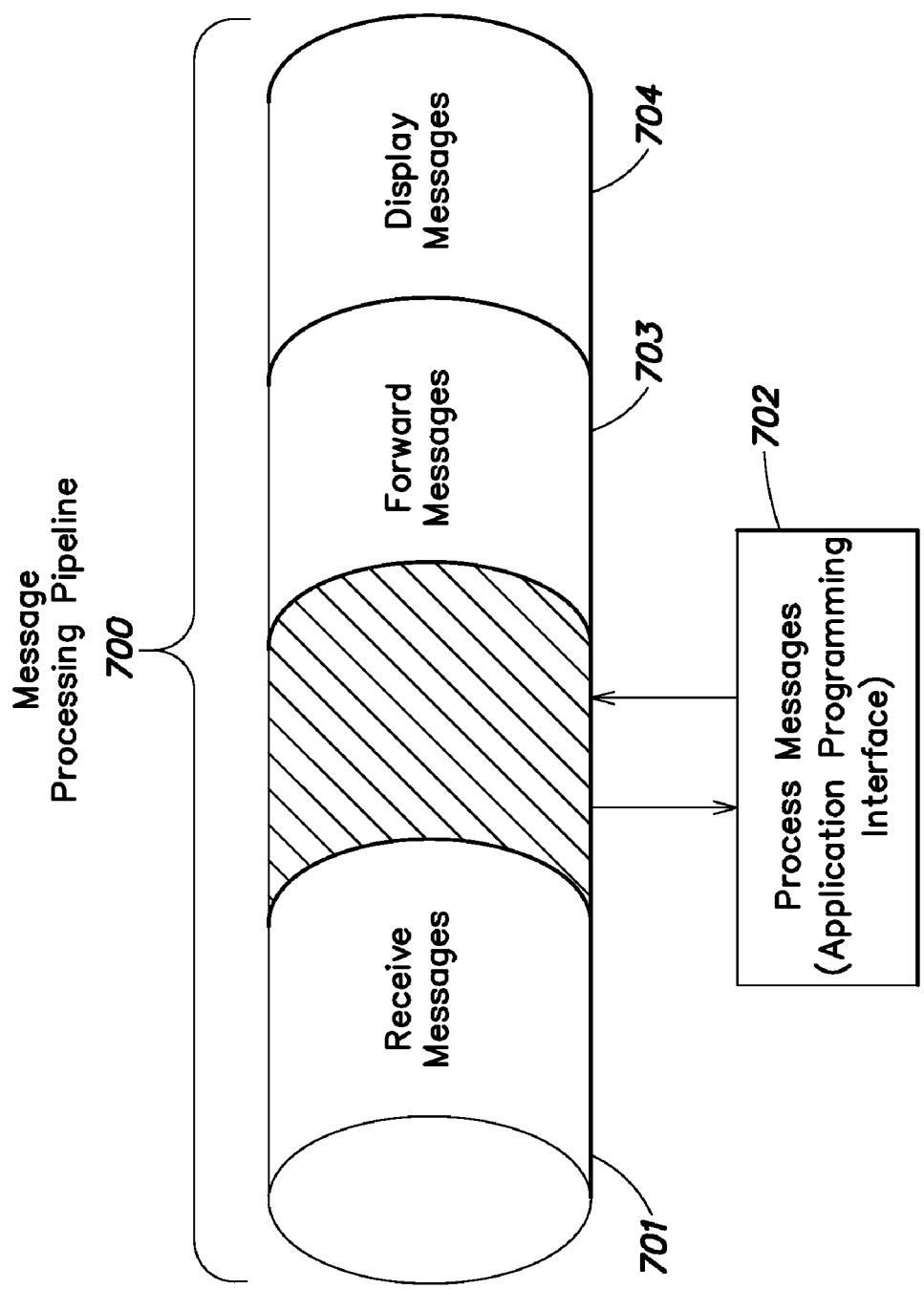
FIG. 7 shows a message processing pipeline according to one embodiment.

FIG. 7 shows a message processing pipeline according to one embodiment of the present invention. Such a message processing pipeline 700 may be implemented in one or more systems within a distributed instant messaging network (e.g., within distributed system 200). Within pipeline 700, the pipeline first receives messages at element 701. At element 702, instant messages are processed. For instance, structure may be added to messages based on information relating to the conversation or information located within the unstructured message. According to one embodiment, an application programming interface (API) is provided to programmers so that any one of a number of functions may be performed on incoming messages to permit any kind of functionality desired by the programmer. For instance, the API may permit a programmer to define their own codes to an instant message by an instant message processor. Once processed, the messages are forwarded to one or more systems (e.g., client systems, servers, processes or applications) as necessary by an instant message processor as discussed above. Further, at element 704, messages or information relating to the messages may be displayed to one or more users.

The following may be example methods of a messaging pipeline API that may be used to process messages (e.g., by an instant message processor). They may specify, for example, how a particular instant message may be displayed (e.g., in a message grid), how the structured text may be encoded, among other processing functions relating to an instant message format. For instance, a message pipeline may include the following methods:

Methods
HighlightFind
  If _findEnabled is true,
    Locates the _findText in the message and highlights the text
    If _findText is not null or empty string and _findText does not exist in the message and _findShowAll is false, then the pipeline returns null immediately.

FormatTab
  Create XML output string by matching encoded contents to column definitions found in _gridColumnList. If there is no encoding present, place the message text into the 'message' column. If there is no ticker encoded and the _deriveTickerFromMessage is true, then the first word of the message is copied into the ticker field if the ticker field is in the _gridColumnList.
Encoding scheme
Form data may be encoded and stored within an HTML comment. The encoding may be performed by using a string including letters and numbers.
  The first field may indicates the Form type and version of that form:
    A1A1—Chat
    A1B1—Naturals
      A—Ticker
      B—Side
      C—Quantity
      D—Price
      E—Note
    A1C1—Advert
      A—Ticker
      B—BSX
      C—Quantity
      D—Note
    A1D1—Show
      A—Ticker
      B—Note
    A1E1—Recap
      A—Ticker
      B—Note
    A1F1—Market Color
      A—Ticker
      B—Sector
      C—Note
    A1G1—Market
  Z# is used to skip over the HTML markup code
Column Names
Time—timestamp and date if enabled
From—Sender's display name
To—(ignore for now)
CType—Chat, Naturals, Advert, Show, Recap, Market Color, Market
MType—(ignore for now)
Ticker—From Form or derived from Message if enabled
Side—From Form
Qnty—From Form
Price—From Form
Message—HTML message without comment
Sector—From Form Thus, in the example methods above, methods may be defined that are capable of defining structure that modifies or interprets the unstructured text, governs how the unstructured text is displayed in a display to the user, or is otherwise processed by a receiving system.

FIG. 8 shows an example message processing according to one embodiment of the present invention illustrating a use of a message processing pipeline (e.g., pipeline 700 as discussed above). In particular, FIG. 8 shows a processing of a message as the message is transmitted to the instant messaging network. Also, FIG. 8 shows an example of how a message grid (e.g., message grid 802) and a message processing pipeline (e.g., pipeline 803) may be used to process messages according to various embodiments of the invention.

The flow begins with a user creating particular filter criteria for the message grid 802 which is displayed to the user 801. This criteria specified by user is passed to a message processing pipeline 803, which may be executed in one or more instant messaging processors located within the distributed communication network. When a message is received from the instant messaging network 804, the message processing pipeline at 803 processes the message based on the filter criteria for the message grid 802. If, in one example, a received message does not match the particular filter criteria as specified by the message grid 802, that message is not transferred to message grid 802 and/or user 801. However, the if another message that does match the particular filter criteria specified by message grid 802, information from that message may be displayed within message grid 802 and subsequently, that message may be displayed to user 801. In this way, different filter criteria may be specified (e.g., by the user) such that the most important and/or relevant messages are displayed within the message grid.

Figure 9A:
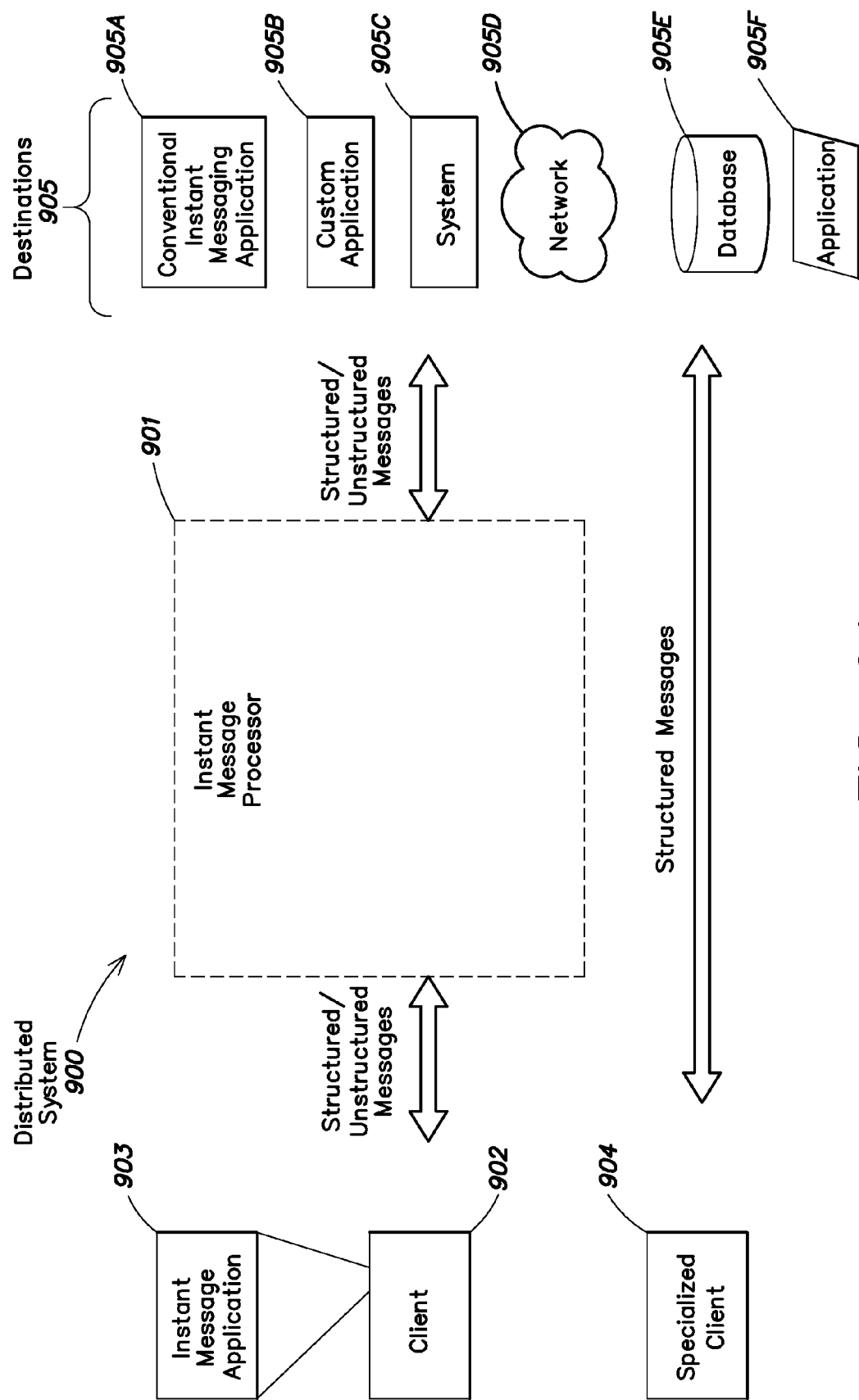
FIG. 9A shows one example distributed system capable of communicating instant messages according to various aspects of the present invention.

FIG. 9A is a block diagram showing various systems that may be adapted to use structured messaging according to various embodiments of the present invention. As discussed above, any number and type of entities may be adapted to use structure within instant messages. FIG. 9A shows various entities that may be capable of processing and receiving instant message information within a distributed system 900. For example, one or more systems (e.g., a client 902 having an instant message application program 903) may be capable of generating one or more structured and/or unstructured messages. For instance, a conventional instant messaging application program such as the AOL IM instant message application program may be capable of generating unstructured instant messages. In another example, a specialized client may be provided (e.g., a client computer system having a custom instant message application, a specially-programmed system, application, or other entity) that is configured to communicate structured messages natively with other entities (e.g., destination entities 905).

In the case of unstructured messages, these messages may be processed and modified by an instant message processor 901 to create structured messages. Instant message processor 901 may be configured to receive and process instant messages originated by a number of different systems. Structured instant messages may be transmitted to any number of destinations 905 including, but not limited to conventional instant messaging application 905A (such as the AOL IM application), and a custom application program 905B, such as a custom instant messaging application that is specially-configured to recognize and be responsive to structured information. Further, structured instant messages can be transmitted to any number of other types of destinations, such as any other type of system 905C (e.g., an order management system), network 905D (e.g., an IM network, financial network, LAN, or other communication network), database 905E (e.g., data warehouse, data-driven application, or other storage entity), application 905F (e.g., a pricing system, risk analysis system, etc.), or other entity.

Structured messages may also be communicated directly between entities that are configured to format and recognize such structured instant messages. For instance, specialized client 904 may be capable of communicating structured instant messages directly to one or more destinations 905 (e.g., destinations 905A-905F), and in such a case, an intermediate message processor 901 may not be required to communicate such messages.

Figure 9B:
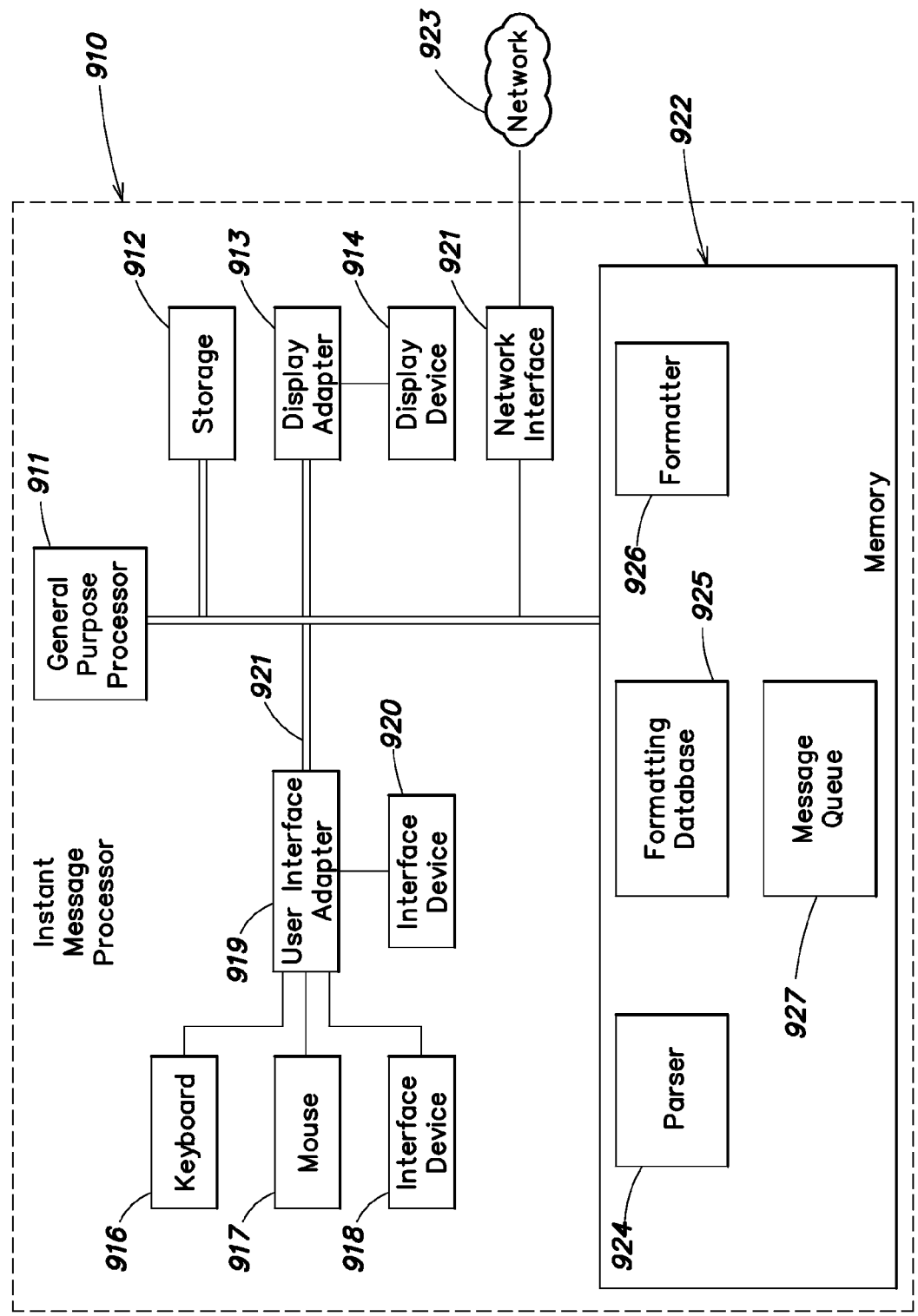
FIG. 9B shows one example system capable of processing instant messages according to various aspects of the present invention.

FIG. 9B is a block diagram showing, in more detail, an instant message processor in accordance with one embodiment of the present invention. Processor 910 may be, for example, an implementation of the processor 204, or instant message processor 910. Processor 910 may include, for example, conventional computer system hardware that stores and executes specially configured computer software for carrying out a method in accordance with various embodiments of the present invention. By way of example, processor 910 may be implemented as a specially configured system that is capable of communicating with one or more instant messaging networks. By way of example, processor 910 may use conventional hardware including a processor (e.g., a commercially available general-purpose processor 911 such as an Intel Xeon processor) and an operating system (e.g., a commercially-available general-purpose operating system such as Red Hat Enterprise Linux, Microsoft Windows server software (e.g., 2003), or other operating system type.

Processor 910 may also include a number of hardware elements such as input/output devices, storage devices, memories, and display devices. Further such conventional hardware may be configured with specially-configured software for performing various functions as described above. The system may also be configured for communication with one or more IM networks. By way of example, the processor 910 may be configured with any IM software that permits communication with an IM network. The software may be written in any type of programming language to provide creation, storing and processing of messages between public IM networks. According to another embodiment, instant message processor 910 may be configured to communicate with other types of networks, such as a FIX network implementing the well-known Financial Information eXchange (FIX) protocol. The FIX protocol is widely used in the financial community for automating securities trading.

Accordingly, the instant message processor 910 of FIG. 9B may include a general purpose microprocessor (CPU) 911 and a bus 921 employed to connect and enable communication between general purpose processor 911 (e.g., a microprocessor, microcontroller, or other type of processor) and components of the instant message processor 910 in accordance with well-known techniques.

Instant message processor 910 may include a user interface adapter 919, which connects general purpose processor 911 via bus 921 to one or more interface devices, such as a keyboard 916, mouse 917, and/or other interface device(s) 918, 920, which can be any user interface device, such as a touch sensitive screen, digitized entry pad, or any other interface device type. Bus 921 may also connect a display device 914, such as an LCD screen or monitor, to the processor 902 via a display adapter 913. Bus 921 may also connect processor 911 to memory 922 and long-term storage 912 (collectively, "memory") which can include a hard drive, diskette drive, tape drive, or any other type of device, system, and/or software that is capable of storing data.

Instant message processor 910 may communicate with other computers or networks of computers, for example via a network interface 921 (e.g., a communications channel, network card, modem, or other communication interface). Instant message processor 910 may be associated with such other computers in one or more networks 923 (e.g., including one or more local area networks (LANs), wide area networks (WANs), etc.).

Instant message processor 910 may be specially-configured software and/or hardware in accordance with one embodiment of the present invention. Accordingly, as shown in FIG. 9B, instant message processor 910 may include various components, including a parser 924 for parsing IM communications received from one or more systems to determine whether such unstructured messages received include information that can be translated into structure and inserted into outgoing messages. In one embodiment, parser 924 may be adapted to parse a received IM communication to identify tokens within a received IM.

Received instant messages may be stored in one or more storage systems. In one embodiment, received messages may be stored in a message queue 927, where they can be retrieved and processed.

In one embodiment, if it is determined that a received message should be modified by instant message processor 910, a formatter 926 may format an instant message from the queue 927. Instant message processor 910 may also include a formatting database 925 that defines how instant messages should be formatted. In one example implementation, formatter 926 may encode structure into outgoing instant messages.

Further, it should be appreciated that one or more functions or components of the instant message processor 910 may be incorporated in one or more end systems (e.g., a client system). For instance, a client computer may include components of the instant message processor that receive and format unstructured instant message information.

Optionally, instant message processor 910 includes software for connecting to the third-party IM networks. Instant message processor 910 may also connect an instant messaging network to a FIX network. For instance, instant message processor 910 may accomplish this function by listening for events from either network, and taking appropriate actions when an event occurs. For example, one type of event that would trigger a message to be generated on a FIX network could be the receipt of an IM communication.

Software programming code for carrying out the inventive method is typically stored in memory. Accordingly, instant message processor 910 may store in its memory microprocessor executable instructions including programs for carrying out the method described above. Additionally, computer readable media may be used for storing computer readable code, when executed, carries out method acts identified above and below with respect to the recited claims. Computer readable media may also be adapted to execute on one or more computer systems to cooperatively carry out various acts described above. The computer readable medium may also be packaged as a computer program product (e.g., a disc) that is sold to a user for carrying out various acts consistent with principles of the present invention. Also, it should be appreciated that the computer program product may be downloaded over a communication network such as the Internet.

As discussed above, a client's system used for viewing, creating and sending IM communications may include specially-configured IM client software instead of conventional, commercially-available IM client software (e.g., the AOL IM instant messaging software application). In addition to permitting a user to send IM communications, such specially-configured IM client software may provide the ability to connect to multiple, different IM networks, such as AOL, MSN, etc. and to display corresponding chat windows for each network within a single client window, such that multiple IM communications sessions may be viewed concurrently within a single client software application, such as shown in FIG. 5.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. In a distributed computer system, a method for processing instant message information, the method comprising acts of:
   receiving, at a client computer, a plurality of instant messages from a plurality of users, at least one instant message having modified information having structured content including at least one attribute identified from unstructured content of the at least one instant message;
   identifying a plurality of conversations, each of which is associated with at least one of the plurality of users;
   displaying simultaneously, to a user of the client computer, an interface that shows information relating to a first one of the plurality of conversations associated with a first one of the plurality of users and information relating to a second one of the plurality of conversations associated with a second one of the plurality of users, wherein the second one of the plurality of users is not associated with the first one of the plurality of conversations; and
   displaying within the interface at least one portion of the unstructured content in a particular row of a message grid associated with a respective conversation, wherein the at least one portion of the unstructured content is displayed in the particular row of the message grid responsive to the structured content including the at least one identified attribute.

2. The method according to claim 1, further comprising an act of displaying, in respective rows of the message grid, the information relating to the first one of the plurality of conversations and the second one of the plurality of conversations.

3. The method according to claim 1, further comprising an act of displaying at least one portion of the unstructured message in a display responsive to the structured content including the at least one identified attribute.

4. The method according to claim 1, further comprising an act of determining a formatting of the unstructured message in the display responsive to the structured content including the at least one identified attribute.

5. The method according to claim 1, wherein the distributed computer system includes a securities trading system, and wherein the securities trading system is responsive to the structured content including the at least one identified attribute.

6. The method according to claim 1, further comprising an act of modifying a display attribute of the display responsive to the structured content including the at least one identified attribute.

7. The method according to claim 6, wherein the display attribute is an attribute of a message grid, and wherein the display attribute of the message grid is controlled responsive to the structured content including the at least one identified attribute.

8. The method according to claim 1, wherein the structured content is inserted in a predetermined area in the at least one instant message, wherein the information within the predetermined area does not affect a presentation of the instant message within a display of an instant message application program.

9. The method according to claim 8, wherein the structured content is selectively inserted by an instant message processor in the predetermined area based on a type of an instant message application program being executed at the client computer.

10. A distributed computer system including a client computer system comprising:

means for receiving, at the client computer system, a plurality of instant messages from a plurality of users, at least one instant message having modified information having structured content including at least one attribute identified from unstructured content of the at least one instant message;

means for identifying a plurality of conversations, each of which is associated with at least one of the plurality of users;

means for displaying simultaneously, to a user of the client computer system, an interface that shows information relating to a first one of the plurality of conversations associated with a first one of the plurality of users and information relating to a second one of the plurality of conversations associated with a second one of the plurality of users, wherein the second one of the plurality of users is not associated with the first one of the plurality of conversations; and means for displaying within the interface at least one portion of the unstructured content in a particular row of a message grid associated with a respective conversation, wherein the at least one portion of the unstructured content is displayed in the particular row of the message grid responsive to the structured content including the at least one identified attribute.

11. The computer system according to claim 10, further comprising means for displaying, in respective rows of a message grid, the information relating to the first one of the plurality of conversations and the second one of the plurality of conversations.

12. The computer system according to claim 10, further comprising means for displaying at least one portion of the unstructured message in a display responsive to the structured content including the at least one identified attribute.

13. The computer system according to claim 10, further comprising means for determining a formatting of the unstructured message in the display responsive to the structured content including the at least one identified attribute.

14. The computer system according to claim 10, wherein the distributed computer system includes a securities trading system, and wherein the securities trading system is responsive to the structured content including the at least one identified attribute.

15. The computer system according to claim 10, further comprising means for modifying a display attribute of the display responsive to the structured content including the at least one identified attribute.

16. The computer system according to claim 15, wherein the display attribute is an attribute of a message grid, and wherein the display attribute of the message grid is controlled responsive to the structured content including the at least one identified attribute.

17. The computer system according to claim 10, wherein the structured content is inserted in a predetermined area in the at least one instant message, wherein the modified information within the predetermined area does not affect a presentation of the instant message within a display of an instant message application program.

18. The computer system according to claim 17, wherein the structured content is selectively inserted by an instant message processor in the predetermined area based on a type of an instant message application program being executed at the client computer.

19. A non-transitory computer-readable medium comprising instructions that, when executed by a computer system, performs a method according to claim 1.

* * * * *